(12) United States Patent
Hotta et al.

(10) Patent No.: US 10,654,440 B2
(45) Date of Patent: May 19, 2020

(54) METHOD OF FOLDING AN AIRBAG FOR A DRIVER'S SEAT

(71) Applicant: TOYODA GOSEI CO., LTD., Kiyosu-shi, Aichi-ken (JP)

(72) Inventors: Masashi Hotta, Kiyosu (JP); Kenji Fujimura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 42 days.

(21) Appl. No.: 16/002,069

(22) Filed: Jun. 7, 2018

(65) Prior Publication Data
US 2019/0001915 A1 Jan. 3, 2019

(30) Foreign Application Priority Data
Jun. 28, 2017 (JP) .................. 2017-126757

(51) Int. Cl.
*B60R 21/237* (2006.01)
*B60R 21/239* (2006.01)
*B60R 21/2338* (2011.01)
*B60R 21/203* (2006.01)
*B60R 21/2346* (2011.01)

(52) U.S. Cl.
CPC .......... *B60R 21/237* (2013.01); *B60R 21/239* (2013.01); *B60R 21/2338* (2013.01); *B60R 21/203* (2013.01); *B60R 21/2346* (2013.01); *B60R 2021/23382* (2013.01)

(58) Field of Classification Search
CPC .......................... B60R 21/237; B60R 21/2375
See application file for complete search history.

(56) References Cited

U.S. PATENT DOCUMENTS

| | | | | | |
|---|---|---|---|---|---|
| 5,022,676 | A | * | 6/1991 | Rogerson | ............... B60R 21/237 280/728.2 |
| 5,360,387 | A | * | 11/1994 | Baker | ................... B60R 21/237 280/243 |
| 5,493,846 | A | * | 2/1996 | Baker | ................... B60R 21/237 280/743.1 |

(Continued)

FOREIGN PATENT DOCUMENTS

| | | |
|---|---|---|
| JP | 2006-290325 A | 10/2006 |
| JP | 2008-013162 A | 1/2008 |

(Continued)

*Primary Examiner* — Nicole T Verley
(74) *Attorney, Agent, or Firm* — Posz Law Group, PLC

(57) ABSTRACT

A method of folding is provided for folding an airbag including a vehicle-side wall, a driver-side wall, an inlet opening formed in the vehicle-side wall and a mounting seat disposed in a periphery of the opening. The method includes a first process conducted in a first direction and a second process conducted in a second direction orthogonal to the former. The first process includes an initial folding that folds back each of opposite sides in the first direction of the airbag as flattened with respect to the mounting seat towards the mounting seat, a rolling that rolls the airbag towards the mounting seat from creases formed in the initial folding, and an invaginating that invaginates each of resulting rolled regions between the vehicle-side and driver-side walls. The second process folds up opposite sides in the second direction of the airbag with respect to the mounting seat each towards the mounting seat.

5 Claims, 28 Drawing Sheets

(56) References Cited

U.S. PATENT DOCUMENTS

| | | | | |
|---|---|---|---|---|
| RE35,265 E | * | 6/1996 | Baker | B60R 21/237 280/743.1 |
| 6,110,094 A | * | 8/2000 | Wallentin | B60R 21/237 280/728.1 |
| 6,422,588 B2 | * | 7/2002 | Hieber | B60R 21/237 280/728.1 |
| 6,432,033 B1 | * | 8/2002 | Salzmann | B60R 21/237 280/728.1 |
| 6,588,793 B2 | * | 7/2003 | Rose | B60R 21/2171 280/728.2 |
| 6,607,210 B2 | * | 8/2003 | Eckert | B60R 21/233 280/732 |
| 7,163,232 B2 | * | 1/2007 | Yokoyama | B60R 21/201 280/730.2 |
| 7,926,844 B2 | * | 4/2011 | Williams | B60R 21/237 280/732 |
| 8,806,773 B2 | * | 8/2014 | Nebel | B60R 21/237 34/357 |
| 9,994,187 B2 | * | 6/2018 | Okuhara | B60R 21/232 |
| 10,239,482 B2 | * | 3/2019 | Hepp | B60R 21/237 |
| 2010/0090446 A1 | | 4/2010 | Choi | |
| 2018/0229685 A1 | * | 8/2018 | Song | B60R 21/237 |
| 2018/0236965 A1 | * | 8/2018 | Fischer | B60R 21/237 |

FOREIGN PATENT DOCUMENTS

| | | | |
|---|---|---|---|
| JP | 2009-012502 A | | 1/2009 |
| JP | 2010-95242 A | | 4/2010 |
| JP | 2013071677 A | * | 4/2013 |
| WO | WO-2008069704 A1 | * | 6/2008 ........... B60R 21/237 |

* cited by examiner

METHOD OF FOLDING AN AIRBAG FOR A DRIVER'S SEAT

CROSS REFERENCE TO RELATED APPLICATIONS

The Present application claims priority from Japanese Patent Application No. 2017-126757 of Hotta et al., filed on Jun. 28, 2017, the entire disclosure of which is incorporated herein by reference.

BACKGROUND OF THE INVENTION

1. Field of the Invention

The present invention relates to a method of folding an airbag for a driver's seat which is adapted to be mounted on a steering wheel of a vehicle.

2. Description of Related Art

JP 2006-290325 A, by way of example, discloses a known airbag for a driver's seat which is adapted to be mounted on a boss section of a steering wheel in a folded-up configuration. The airbag includes a vehicle-side wall which is to be supported by a rim of the steering wheel at deployment and a driver-side wall which is joined with the vehicle-side wall by the outer circumferential edge and deployable towards the driver' seat. The vehicle-side wall is provided with an inlet opening for introducing an inflation gas at a vicinity of the center, and a peripheral area of the inlet opening serves as a mounting seat to be secured to a housing (or to the boss section). When the airbag is folded up into a folded-up configuration sized to fit the housing, it is contracted both in a first direction and in a second direction which are orthogonal each other at the mounting seat (e.g. in a left-right direction and in a front-rear direction), from a flattened state in which the vehicle-side wall and the driver-side wall are laid flat over each other.

By way of example, a conventional method of folding a driver's seat airbag includes:

an initial folding that folds left and right end regions (i.e. both edges in a first direction) of the airbag as laid out flat towards the mounting seat on the vehicle-side wall;

a rolling that rolls the creases formed in the initial folding each towards the mounting seat on the vehicle-side wall such that the airbag is contracted in size in the left-right direction (i.e. in the first direction);

a folding that folds up front and rear end regions (i.e. both edges in a second direction) of the airbag on the driver-side wall towards an area corresponding to the mounting seat; and a final folding that folds back left and right edges of the airbag on the driver-side wall above the mounting seat.

The above folding method provides a broad, generally square area at a vicinity of the center of the driver-side wall when the airbag protrudes from the boss section, and provides an enough thickness for catching a head of a driver at the center of the airbag in an initial stage of airbag deployment. Thereafter, the airbag completes unfolding and inflation in the end regions in the left-right direction and front-rear direction.

However, in order to catch the head and vicinity of a driver further adequately, the conventional method of folding of a driver's seat airbag still has a room for improvement in ensuring of a broader area in the central region of the airbag while preventing a part of the central region from protruding.

SUMMARY OF THE INVENTION

An object of the present invention is to provide a method of folding an airbag for a driver's seat which enables the airbag to unfold and inflate in a further adequate fashion in an initial stage of deployment.

The airbag which is to be folded up with the method of folding of the invention is adapted to be mounted on and stored in a boss section of a steering wheel of a vehicle. The airbag is configured to be inflated with an inflation gas and includes a vehicle-side wall that is adapted to be supported by a rim of the steering wheel at deployment, a driver-side wall that is joined with the vehicle-side wall by the outer circumferential edge and deployable towards a driver's seat, an inlet opening that is disposed in a vicinity of the center of the vehicle-side wall for introducing an inflation gas, and a mounting seat that is composed of a peripheral area of the inlet opening. The airbag is adapted to be secured to the boss section by the mounting seat.

The method of folding includes an initial layout step that lays the airbag out flat such that the vehicle-side wall and the driver-side wall are laid flat over each other, a first folding process that folds up and contracts the airbag as laid out flat in width in a first direction which runs through the mounting seat, and a second folding process that, after the first folding process, folds up and contracts the airbag in width in a second direction which runs through the mounting seat and is orthogonal to the first direction.

The first folding process includes:

an initial folding step that folds back each of opposite sides in the first direction of the airbag as laid out flat with respect to the mounting seat towards the mounting seat;

an initial rolling step that rolls the airbag towards the mounting seat from creases formed in the initial folding step and forms a pair of rolled regions beside the mounting seat; and an invaginating step that invaginates each of the rolled regions in between the vehicle-side wall and driver-side wall in proximity to the mounting seat.

The second folding process is composed of folding up of opposite sides in the second direction of the airbag with respect to the mounting seat each towards the mounting seat.

When the airbag as folded up with the folding method of the invention is mounted on the steering wheel and is inflated, it unfolds generally in a reverse fashion to the folding method. That is, the folds formed in the second folding process unfold first and then the folds formed in the first folding process unfold. Specifically, in an initial stage of deployment, the airbag as folded up completely firstly unfolds along the second direction in which the second folding process was conducted, and then moves on to unfolding of the folds formed in the last step of the first folding process. Here, according to the folding method of the invention, the last step of the first folding process is composed of the invagination of the rolled regions formed in the initial rolling step in between the vehicle-side wall and driver-side wall. Since the vehicle-side wall and driver-side wall draw away from each other due to inflation of the airbag, the invagination easily undoes in parallel with the unfolding of the folds of the second folding process. Further, the rolled regions formed in the initial rolling step, which was conducted right before the invaginating step, also easily start to unroll along with undoing of the invagination. Accordingly, in the initial stage of deployment, the airbag is not only inflated into an elongated contour in the second direction above the mounting seat, but also ensures a wide enough width in the first direction though it is smaller than a width between the creases of the initial folding. Since the airbag in the initial stage of deployment has an elongated contour in the second direction with certain thickness and with no partly projecting portion in a vicinity of the center of the driver-side wall, the airbag catches the head of a driver smoothly without giving an undue pressure to the head or moving towards a region under the chin (neck) of the driver even if the head is positioned close to the steering wheel. Of course, the airbag as has gone through the initial stage of deployment is fully unfolded and inflated both in the opposite end regions in the second direction and in the opposite end regions in the first direction, thus is capable of catching a driver "in position" adequately with the driver-side wall.

Therefore, the folding method of the invention enables a driver's seat airbag to unfold and inflate in an adequate fashion in the initial stage of deployment, and enables the airbag to catch the driver's head adequately without giving an undue pressure to the head or moving towards the neck region of the driver even if the head is disposed close to the steering wheel.

In the method of folding of the invention, it is desired that the first direction in the first folding process is a direction corresponding to a left and right direction of the steering wheel as mounted on the vehicle.

If the first direction is the direction corresponding to the left and right direction of the steering wheel, the second direction is the front and rear direction, and the airbag unfolds first in the front and rear direction, and extends the rear end region into a space between a rear region of the rim of the steering wheel and the abdomen of a driver in an initial stage of airbag deployment. As a consequence, even if the driver sits close to the steering wheel, the rear end region of the airbag deployed in the space between the rear region of the rim and the abdomen is inflated and gains an enough thickness, supported by the rim, thus is capable of cushioning and protecting the abdomen in an adequate fashion.

The airbag folded up by the folding method of the invention desirably includes a redirecting member that is disposed in a periphery of the mounting seat inside the airbag and includes a pair of main outlet ports that deliver an inflowing inflation gas towards both directions in the second direction.

Such a redirecting member will deliver the inflation gas towards both directions in the second direction in the initial stage of airbag deployment, and further help unfold and elongate the airbag in the second direction in a steady fashion, thereby providing stabilization of the above-described advantageous effects of the invention.

It is further desired that the redirecting member further includes a pair of auxiliary outlet ports which release in combination less amount of inflation gas than the main outlet ports towards both directions in the first direction.

The auxiliary outlet ports release the inflation gas in the first direction, and help unfold and inflate the airbag as gone through the initial stage of deployment towards both directions in the first direction quickly.

It is further desired that the airbag internally includes four tethers each of which regulates a clearance between a vicinity of the mounting seat and the driver-side wall at airbag deployment, and that a root region of each of the tethers joined to the vicinity of the mounting seat is disposed at a position between the first direction and second direction.

Such tethers will limit the clearance between the vehicle-side wall and the driver-side wall, and prevent the driver-side wall from protruding towards the driver partly. Since the root region of each of the tethers is disposed at the position between the first direction and second direction, the tethers will not be likely to hamper the inflation gases released out of the main outlet ports of the redirecting member in the second direction or hamper the inflation gases released out of the auxiliary outlet ports in the first direction, and ensure a steady redirecting effect of the redirecting member.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
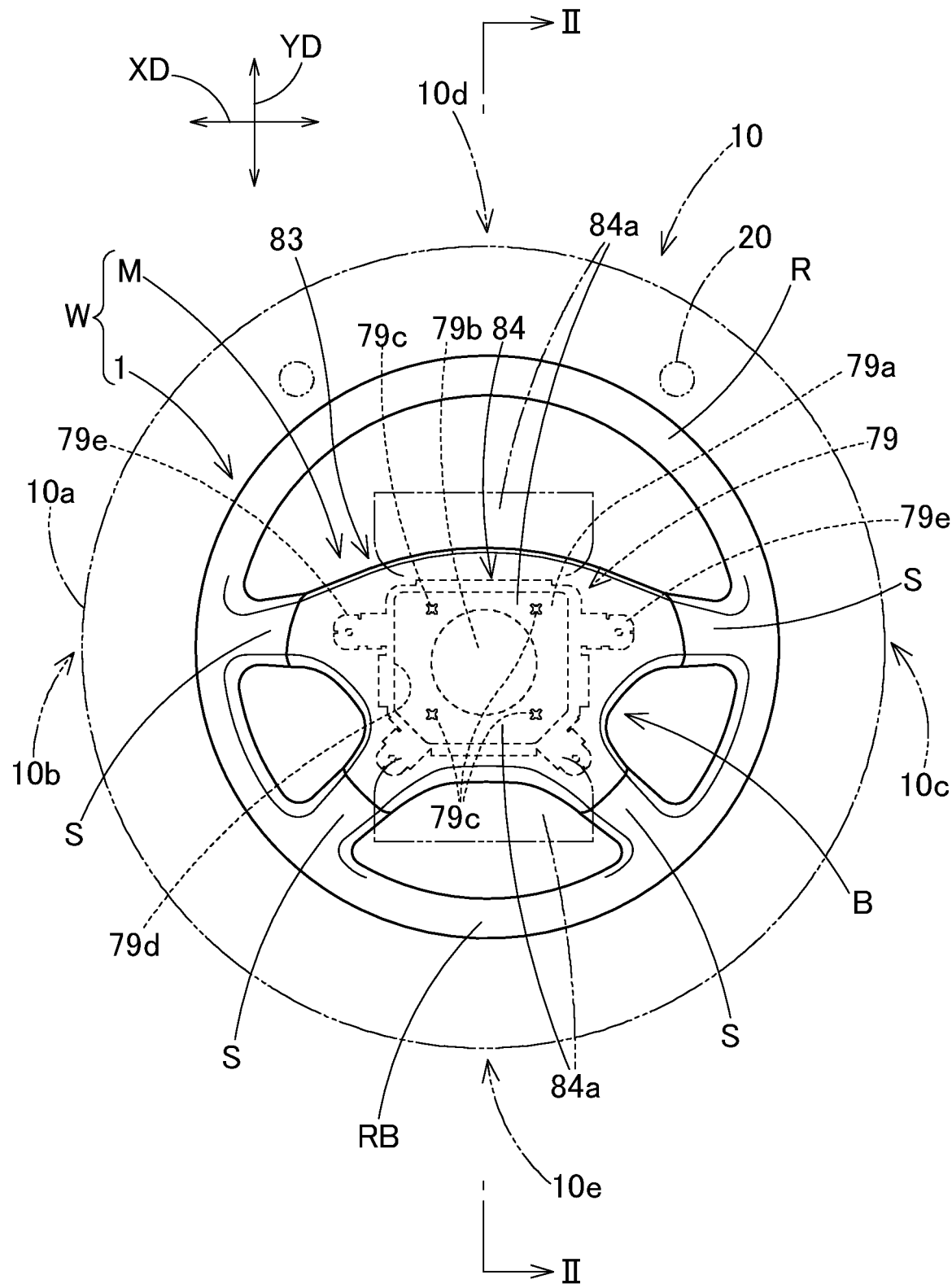
FIG. 1 is a plan view of a steering wheel on which an airbag device provided with an airbag for a driver's seat according to the first embodiment of the invention is mounted.
Figure 2:
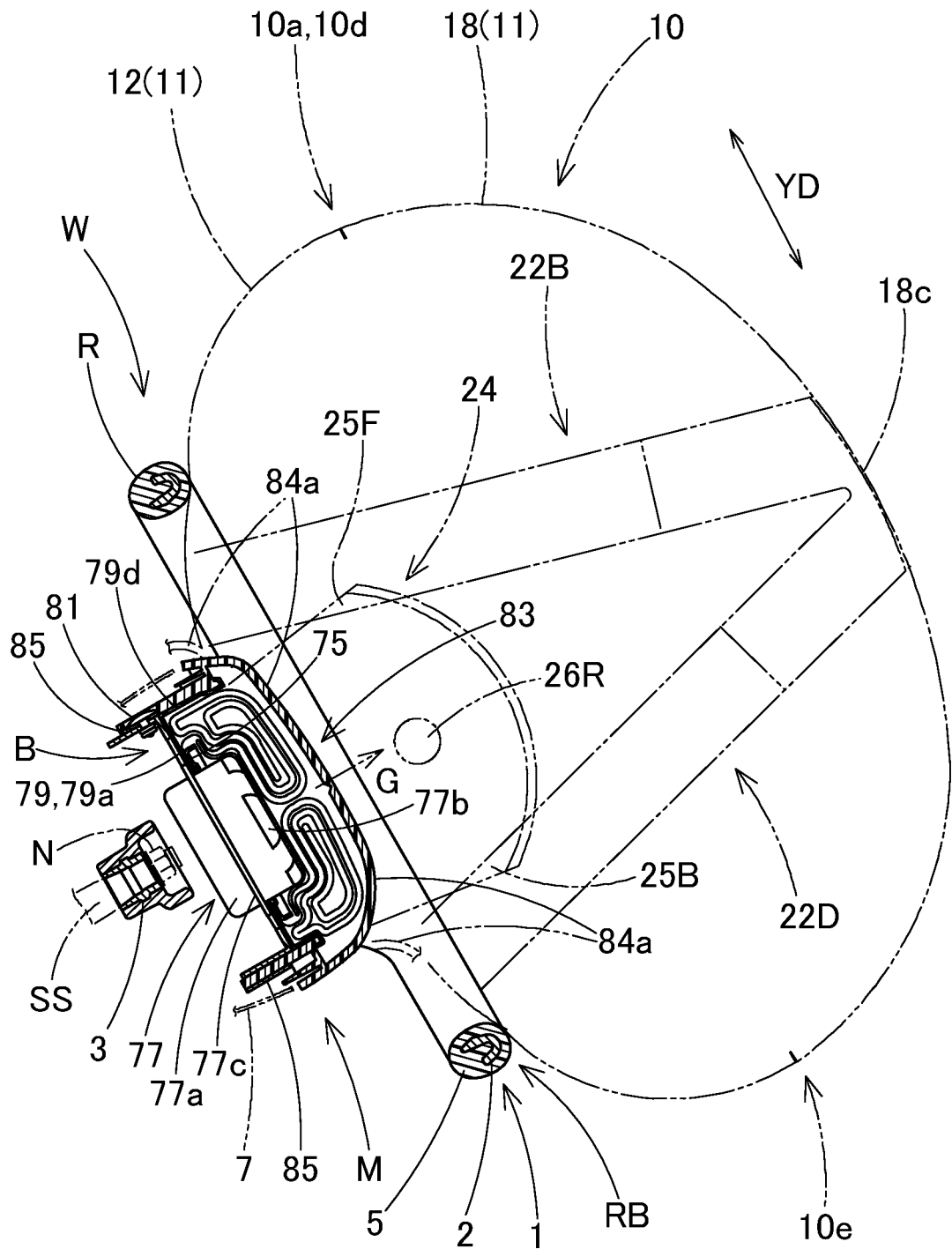
FIG. 2 is a schematic vertical sectional view of the airbag device of FIG. 1 taken along line II-II of FIG. 1.

As shown in FIGS. 1 and 2, an airbag device M for a driver's seat which employs an airbag 10 according to the first embodiment of the present invention is mounted on a steering wheel W of a vehicle. The steering wheel W includes a wheel body 1 and the airbag device M disposed on top of a boss section B at the center of the wheel body 1.

The wheel body 1 includes an annular rim R, the boss section B and four spokes S. The rim R is for holding at steering operation. The boss section B is disposed at the center of the rim R and is secured to a steering shaft SS. The spokes S interconnect the boss section B and the rim R.

In this specification, unless otherwise specified, an up and down direction corresponds to an up and down direction extending along an axis of the steering shaft SS. A front and rear direction corresponds to a front-rear direction YD which is orthogonal to the axis of the steering shaft SS of the vehicle being steered straight ahead, and a left and right direction corresponds to a left-right direction XD which is orthogonal to the axis of the steering shaft SS of the vehicle being steered straight ahead.

As shown in FIGS. 1 and 2, the steering wheel body 1 includes a core 2 made from such metal as aluminum base alloy, and the core 2 has such a contour that the rim R, boss section B and spokes S are interconnected. The core 2 is covered with a cladding layer 5 of synthetic resin on the rim R and regions of the spokes S adjoining the rim R. At an area of the core 2 corresponding to the boss section B is a steel boss 3 through which the steering shaft SS is inserted and then fixed by a nut N. Underneath the wheel body 1 is a lower cover 7 made from synthetic resin for covering the lower side of the boss section B.

As shown in FIG. 2, the airbag device M includes an airbag 10, which is stored in a folded-up configuration, an inflator 77 for supplying the airbag 10 with an inflation gas, an airbag cover 83 covering an upper side of the airbag 10, a case 79 which houses the airbag 10 and the inflator 77 and supports the airbag cover 83, and a retainer 75 which is used to attach the airbag 10 and the inflator 77 to the case 79.

The retainer 75, which is made of a sheet metal, has a square annular contour. The retainer 75 holds down a peripheral area of a later-described inlet opening 14 (i.e. a mounting seat 13) of the airbag 10 and mounts the airbag 10 and the inflator 77 on the case 79. To this end, the retainer 75 includes bolts 75a (FIG. 8A) at the four corners, which are adapted to be fastened to the case 79 with nuts.

The inflator 77 includes a body 77a and a flange 77c. The inflator body 77a is in the form of a pot and is provided on the upper region with a plurality of gas discharge ports 77b. The flange 77c protrudes out of an outer circumference of the body 77a and has unillustrated through holes for receiving the bolts 75a of the retainer 75.

As shown in FIGS. 1 and 2, the case 79 is made of sheet metal and formed into a generally rectangular parallelepiped. The case 79 includes a generally rectangular bottom wall 79a and a side wall 79d extending upward from an outer peripheral edge of the bottom wall 79a. The case 79 is disposed on the boss section B of the steering wheel W, and serves as a housing of the airbag 10. The bottom wall 79a is provided with a circular insert hole 79b for receiving the body 77a of the inflator 77 from the lower side. Around the insert hole 79b are four through holes 79c for receiving the bolts 75a of the retainer 75. At the upper end of the side wall 79d are mounting tongues 79e extending outwardly. Not-shown mounting bases of a not-shown horn switch mechanism are attached to the mounting tongues 79e, and the case 79 is secured to the core 2 of the steering wheel W with the aid of the mounting bases. As a result, the airbag device M is mounted on top of the boss section B of the steering wheel body 1 which has been mounted on the steering shaft SS. Moreover, a later-described side wall 85 of the airbag cover 83 is coupled with the side wall 79d of the case 79 with rivets 81 or the like.

The airbag cover 83 is fabricated of synthetic resin and includes a ceiling wall 84 disposed over the airbag 10 and a side wall 85 having a generally square tubular shape extending downward from a vicinity of an outer peripheral edge of the ceiling wall 84. The ceiling wall 84 includes two doors 84a which are openable forward and rearward when pushed by the airbag 10 as inflated.

Figure 4:
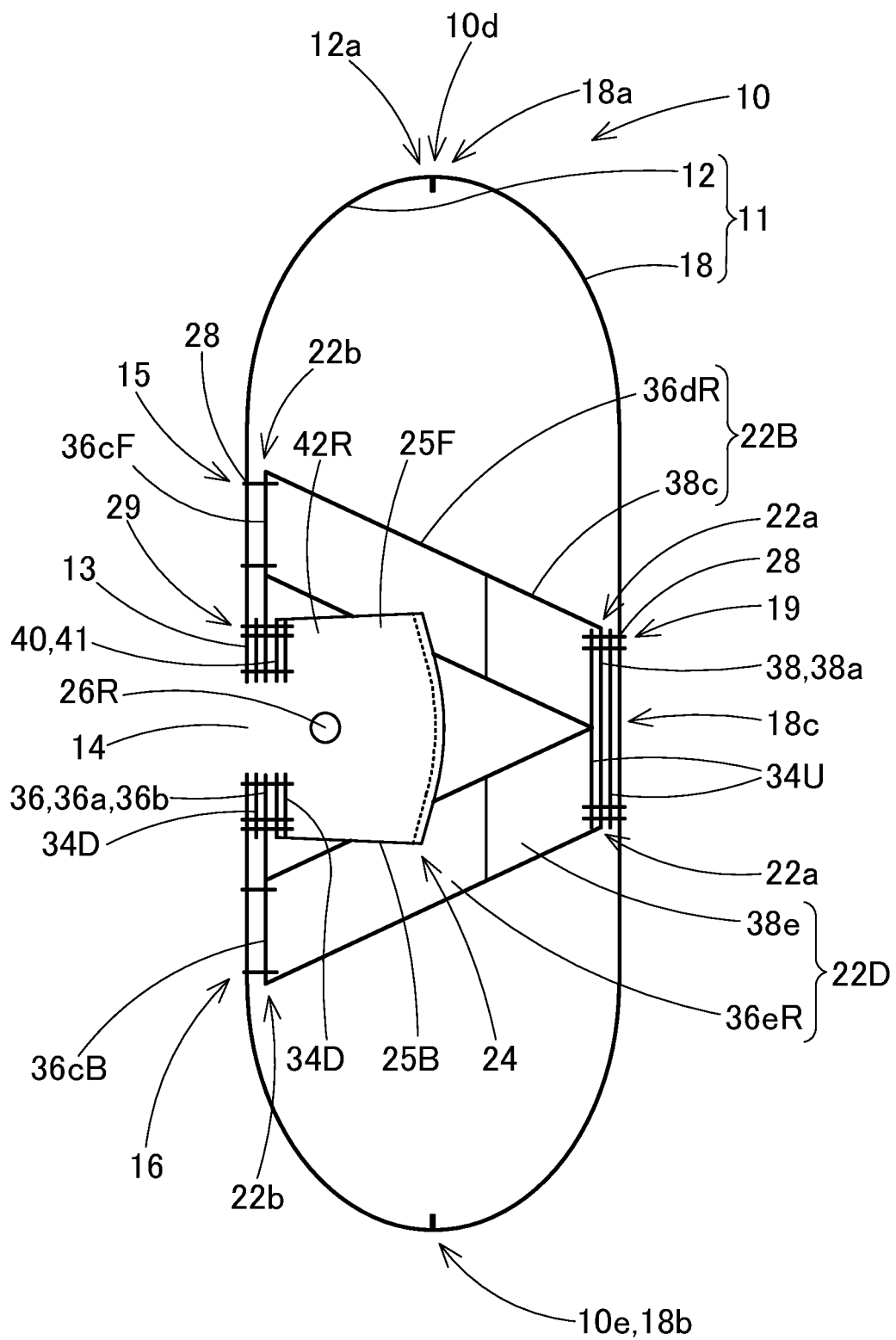
FIG. 4 is a schematic vertical sectional view of the airbag of FIG. 3A.

The airbag 10 is made of a fabric woven with polyamide yarn, polyester yarn or the like, and is inflatable into such a shape that is round when viewed from above and generally oval similar to a circle when viewed from a side, as indicated by double-dotted lines in FIGS. 1 and 2. Referring to FIGS. 2, 4 and 12, a circumferential wall 11 of the airbag 10 is composed of a vehicle-side wall 12 which is deployable towards the steering wheel body 1 (towards the rim R), and a driver-side wall 18 which is deployable to face a driver D.

As shown in FIGS. 2 to 7, the vehicle-side wall 12 and the driver-side wall 18 are formed into an identical round contour, and are sewn together by the circumferential edges 12a and 18a, thus forming the circumferential wall 11 of the airbag 10.

Figure 3A:
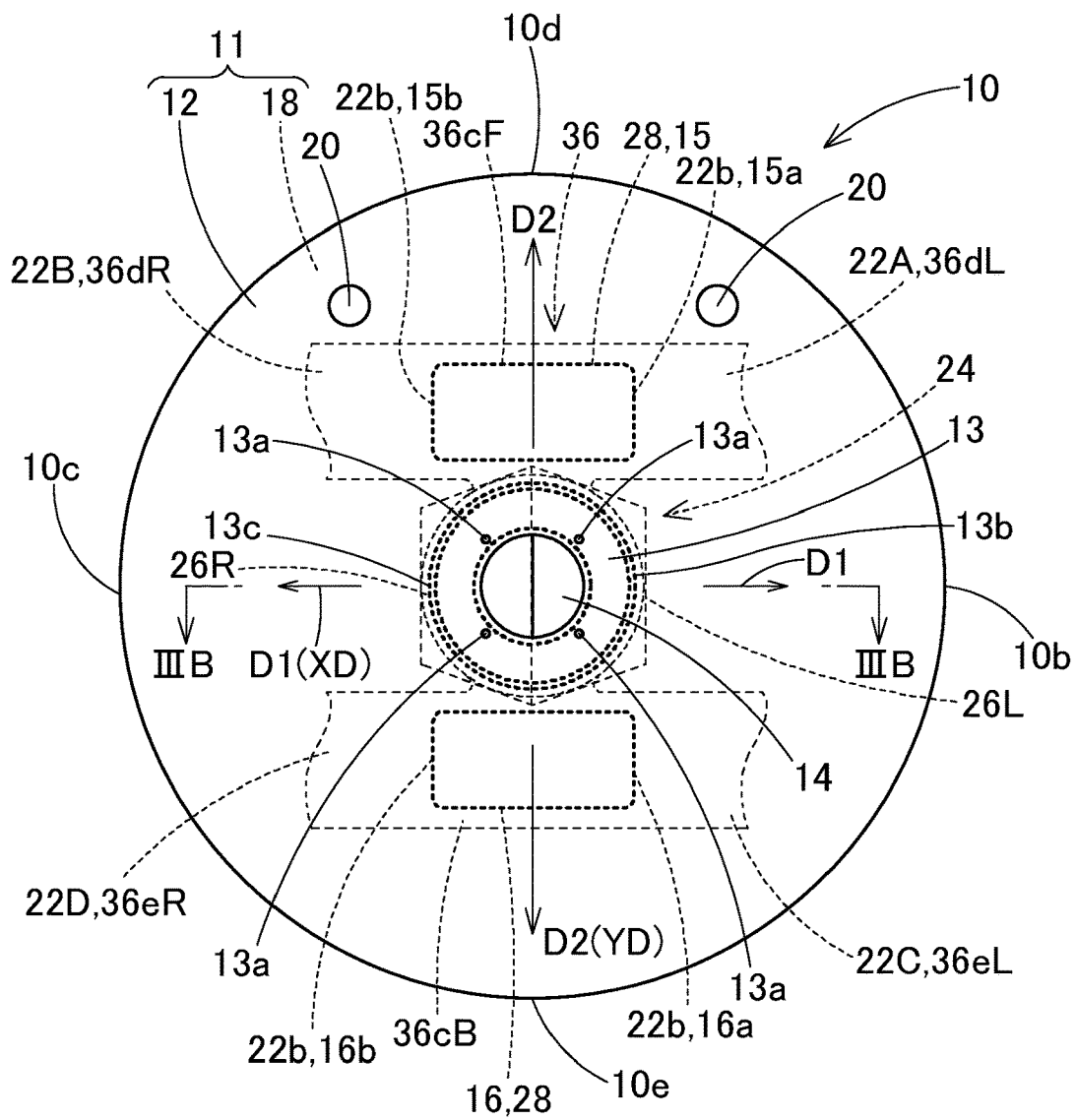
FIG. 3A is a bottom view of the airbag of the first embodiment.
Figure 3B:
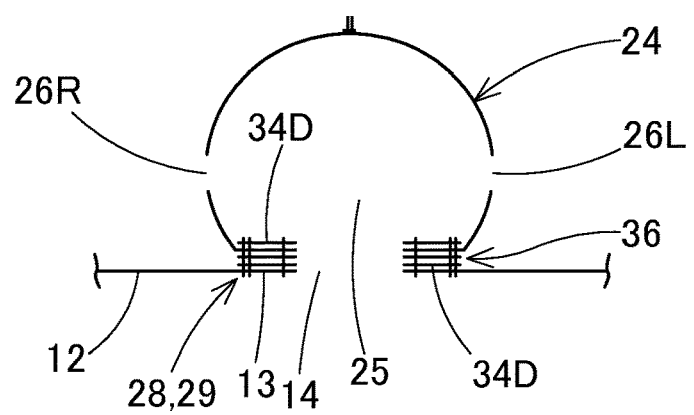
FIG. 3B is a sectional end view taken along line IIIB-IIIB of FIG. 3A.
Figure 5:
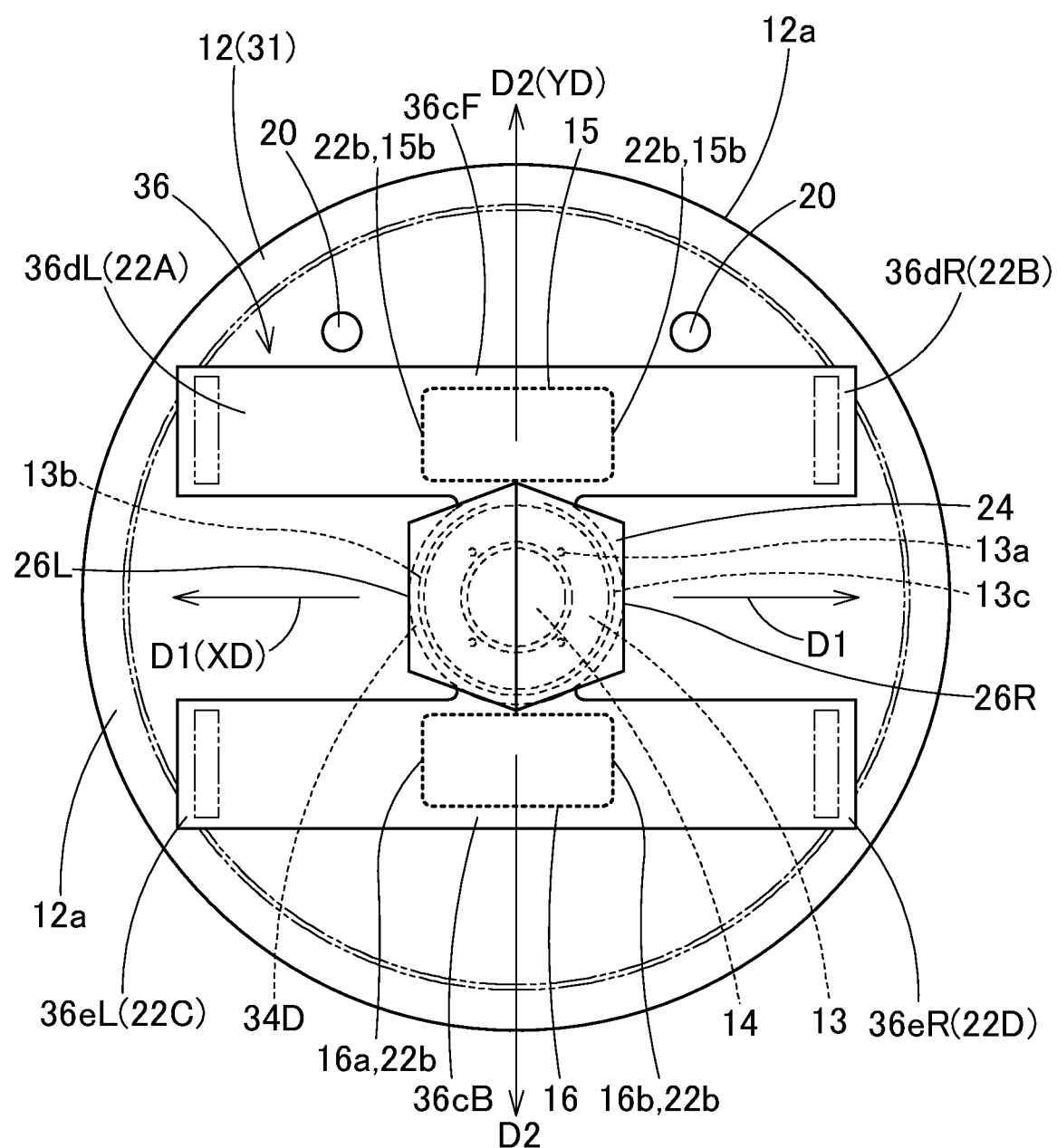
FIG. 5 is a plan view of a vehicle-side wall of the airbag of FIG. 3A as not yet coupled with a driver-side wall, with other components on the part of the vehicle-side wall.

The vehicle-side wall 12 is provided with a round inlet opening 14 for introducing an inflation gas at the center. The peripheral area of the inlet opening 14 serves as a mounting seat 13 by which the airbag 10 is mounted on the bottom wall 79a of the case 79 (in other words, on the boss section B). The mounting seat 13 is provided with mounting holes 13a for receiving the bolts 75a of the retainer 75, as shown in FIGS. 3 and 5. The vehicle-side wall 12 further includes, in the front left and front right area, one each vent hole 20 for exhausting an inflation gas, as shown in FIGS. 1, 3A and 7.

As shown in FIGS. 2 to 6, the airbag 10 internally includes four tethers 22 (22A, 22B, 22C and 22D) that connect the vehicle-side wall 12 (especially, a vicinity of the mounting seat 13) and the driver-side wall 18 for regulating a clearance between the vehicle-side wall 12 and driver-side wall 18 at airbag deployment. The airbag 10 further internally includes a redirecting member 24 that redirects an inflation gas, which has flown in via the inlet opening 14, towards the front and rear. The redirecting member 24 is designed to form an outlet port 25F and an outlet port 25B (a pair of main outlet ports 25F and 25B) so as to redirect the inflation gas towards the front and rear, and also includes, in the left and right area, an auxiliary outlet port 26L and an auxiliary outlet port 26R each of which is round. The auxiliary outlet ports 26L and 26R release in combination less amount of the inflation gas than the outlet ports 25F and 25B.

Figure 7:
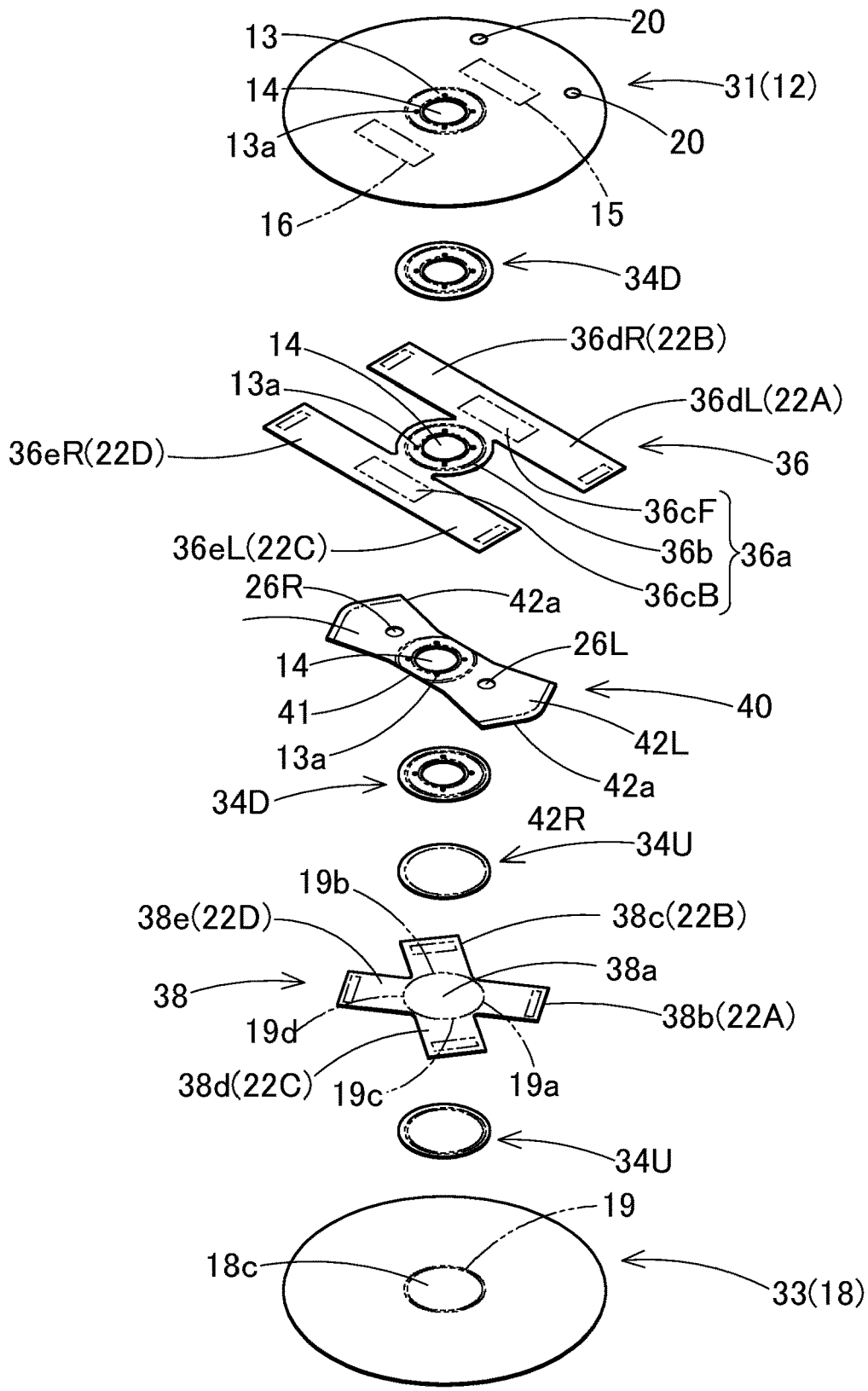
FIG. 7 schematically depicts components of the airbag of the first embodiment by perspective views.

As shown in FIG. 7, the airbag 10 includes, as its constituent members, a generally circular vehicle-side member 31 which forms the vehicle-side wall 12, a generally circular driver-side member 33 which forms the driver-side wall 18, two reinforcing cloths 34D, two reinforcing cloths 34U, tether-forming members 36 and 38 for forming the tethers 22 and a member 40 for forming the redirecting member 24. Each of the constituent members is made of a fabric woven with polyamide yarn, polyester yarn or the like.

Each of the reinforcing cloths 34D is annular in shape, and reinforces the mounting seat 13 of the vehicle-side wall 12. In a similar fashion to the mounting seat 13, each of the reinforcing cloths 34D is provided with the inlet opening 14 and mounting holes 13a. Each of the reinforcing cloths 34U is circular in shape and reinforces a seam of the tether-forming member 38 to the driver-side wall 18.

The tether-forming member 36 is disposed on an inner surface of the vehicle-side wall 12. The tether-forming member 36 includes a base section 36a which is sewn to a vicinity of the mounting seat 13 and arms 36d (36dL and 36dR) and 36e (36eL and 36eR) which form lower regions of the tethers 22A, 22B, 22C and 22D. The base section 36a includes a central region 36b to be sewn to the mounting seat 13 with a sewing thread 28 together with the reinforcing cloths 34D and a pair of protruding regions 36c (36cF and 36cB) each of which is generally rectangular in shape and protrudes towards the front/rear from the front/rear of the central region 36b. In a similar fashion to the mounting seat 13, the central region 36b is provided with the inlet opening 14 and mounting holes 13a.

Each of the protruding regions 36cF and 36cB is sewn to the vehicle-side wall 12 at the front/rear of the mounting seat 13 with a generally rectangular joint 15/16 by a sewing thread 28, as shown in FIGS. 3A and 5. The arms 36d extend from left and right ends of the protruding region 36cF and the arms 36e extend from left and right ends of the protruding region 36cB. The arms 36d and 36e are joined with later-described arms 38b, 38c, 38d and 38e of the tether-forming member 38 in order to form the tethers 22A, 22B, 22C and 22D. Accordingly, regions of left and right short sides 15a, 15b, 16a and 16b of the rectangular joints 15 and 16 of the protruding regions 36cF and 36cB serve as joints of the tethers 22A, 22B, 22C and 22D to the vehicle-side wall 12, i.e. root regions 22b of the tethers 22A, 22B, 22C and 22D.

The root regions 22b of the tethers 22A, 22B, 22C and 22D (i.e. the short side regions 15a, 15b, 16a and 16b) are each located at a position off from a flow direction of the inflation gases flowing out of the main outlet ports 25F and 25B and auxiliary outlet ports 26L and 26R of the redirecting member 24 so as not to hamper the flows of the inflation gases. In other words, the root region 22b of each of the tethers 22 is disposed at a position dislocated from the front-rear direction YD and left-right direction XD running through the inlet opening 14, but on a diagonal direction running through the inlet opening 14, and additionally, at a distance from the redirecting member 24 in the front-rear direction YD. Specifically, as shown in FIGS. 3A and 5, the root region 22b of the left front tether 22A is located at a diagonally forward left position of the inlet opening 14, in front of the redirecting member 24 and at a vicinity of the left edge 13b of the mounting seat 13. The root region 22b of the right front tether 22B is located at a diagonally forward right position of the inlet opening 14, in front of the redirecting member 24 and at a vicinity of the right edge 13c of the mounting seat 13. The root region 22b of the left rear tether 22C is located at a diagonally backward left position of the inlet opening 14, at the rear of the redirecting member 24 and at a vicinity of the left edge 13b of the mounting seat 13. The root region 22b of the right rear tether 22D is located at a diagonally backward right position of the inlet opening 14, at the rear of the redirecting member 24 and at a vicinity of the right edge 13c of the mounting seat 13.

Figure 6:
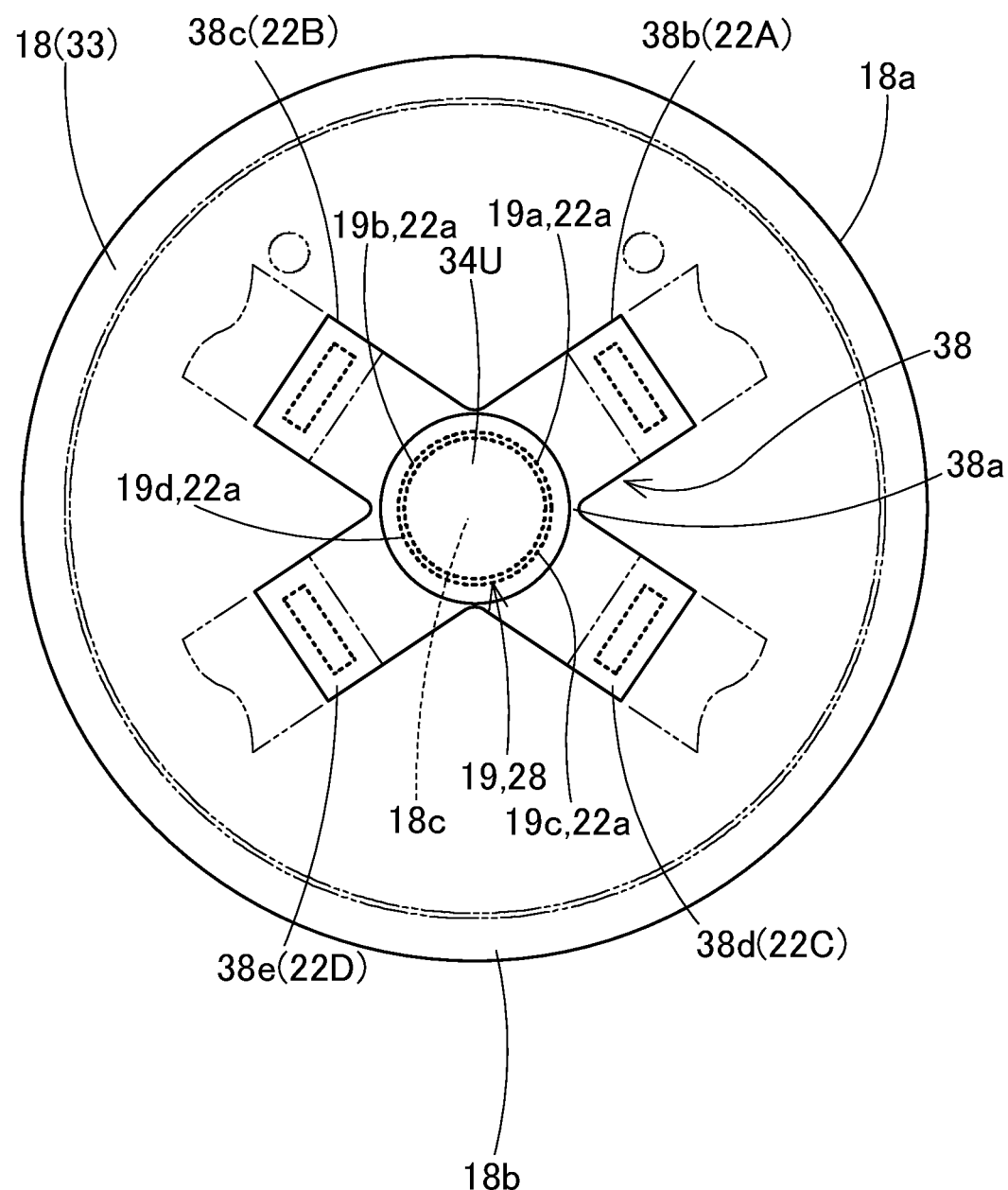
FIG. 6 is a bottom view of the driver-side wall of the airbag of FIG. 3A as not yet coupled with the vehicle-side wall, with other components on the part of the driver-side wall.

As shown in FIG. 6, the tether-forming member 38 is disposed on an inner surface of the driver-side wall 18 and includes a round base section 38a and arms 38b, 38c, 38d and 38e. The base section 38a is sewn to a center 18c of the driver-side wall 18 with an annular joint 19 by a sewing thread 28. The arms 38b, 38c, 38d and 38e extend radially from the base section 38a in four diagonal directions off the front-rear and left-right directions. The arms 38b, 38c, 38d and 38e are each joined with the arms 36d (36dL and 36dR) and 36e (36eL and 36eR) of the tether-forming member 36 and form the tethers 22A, 22B, 22C and 22D. Accordingly, each region of the annular joint 19 adjoining the arms 38b, 38c, 38d and 38e, namely, each quarter circular arc region 19a, 19b, 19c, 19d, serves as a joint of each of the tethers 22A, 22B, 22C and 22D to the driver-side wall 18, i.e. a leading end region 22a of each of the tethers 22A, 22B, 22C and 22D. The two reinforcing cloths 34U reinforce the base section 38a of the tether-forming member 38 as joined to the driver-side wall 18.

The member 40 for forming the redirecting member 24 includes a base section 41 which is sewn to the mounting seat 13 together with the reinforcing cloths 34D and two arms 42L and 42R which extend towards the left and right from the base section 41. In a similar fashion to the mounting seat 13, the base section 41 is provided with the inlet opening 14 and mounting holes 13a. Each of the arms 42L and 42R is provided with a small round auxiliary outlet ports 26L and 26R. The member 40 is joined to the mounting seat 13 by the base section 41 while the leading ends 42a of the arms 42L and 42R are joined (sewn) together. Thus the redirecting member 24 is formed into a tubular shape having the main outlet ports 25F and 25B at the front and rear.

Manufacturing of the airbag 10 is now described. Firstly, the vehicle-side member 31, reinforcing cloths 34D, tether-forming member 36 and member 40 for forming the redirecting cloth 24 are provided with no inlet opening 14 and mounting holes 13a. One of the redirecting cloths 34D, the central region 36b of the tether-forming member 36, the base section 41 of the member 40 and another redirecting cloth 34D are then placed on the inner side of the vehicle-side member 31 and sewn together to the location of the inlet opening 14 with an annular joint 29 (FIG. 3B) by a sewing thread 29. Subsequently, the protruding regions 36cF and 36c B of the tether-forming member 36 are each sewn to the vehicle-side wall 12 with the generally rectangular joints 15 and 16 by the sewing thread 28. Then the inlet opening 14 and mounting holes 13a are punched out. The vent holes 20 of the vehicle-side member 31 may be punched out at this time. Alternatively, the vehicle-side member 31 may be provided with the vent holes 20 in advance.

On the part of the driver-side wall 18, the base section 38a of the tether-forming member 38 is placed between the reinforcing cloths 34U, and in that state the base section 38a and the reinforcing cloths 34U are sewn to an inner side of the center 18c of the driver-side wall 18 with the annular joint 19, as shown in FIG. 6.

Thereafter, the vehicle-side wall 12 and driver-side wall 18 are mated such that the outer sides face inward, and sewn together by the outer circumferential edges 12a and 18a. Then the airbag 10 is reversed inside out from the inlet opening 14, and the arms of the tether-forming members 36 and 38 are taken out of the inlet opening 14, and mating arms of the tether-forming members 36 and 38, i.e. the arms 36dL and 38b, the arms 36dR and 38c, the arms 36eL and 38d and the arms 36eR and 38e, are coupled together, thus forming the tethers 22A, 22B, 22C and 22D. The arms 42L and 42R of the member 40 are also sewn together by the leading ends 42a to form the redirecting member 24. When the tethers 22A, 22B, 22C and 22D and redirecting member 24 are put back in the airbag 10, the airbag 10 is completed.

Figure 11A:
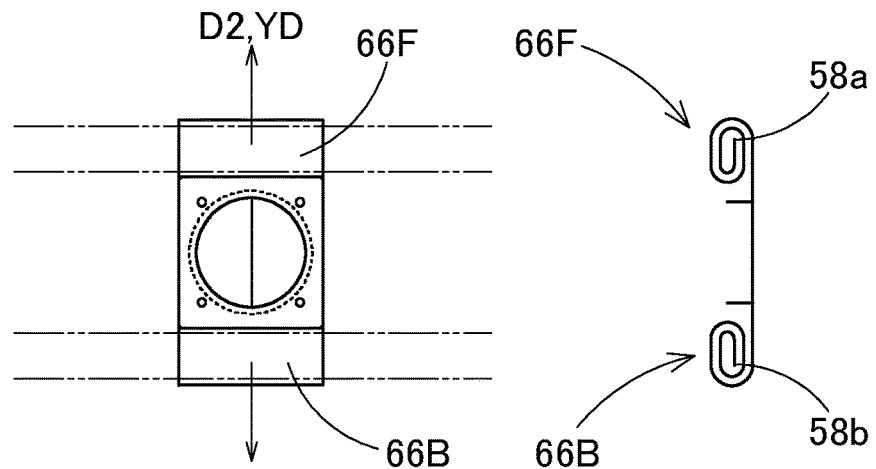
Figure 11B:
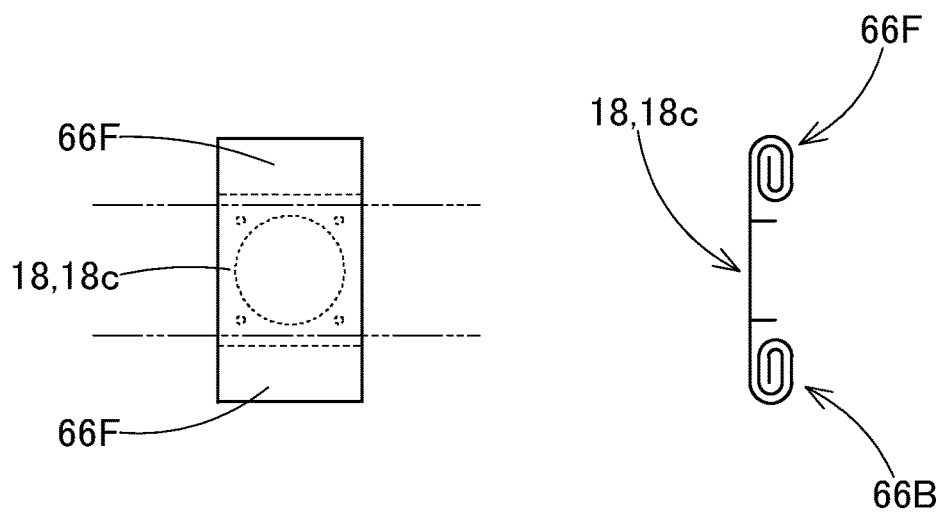
Figure 11C:
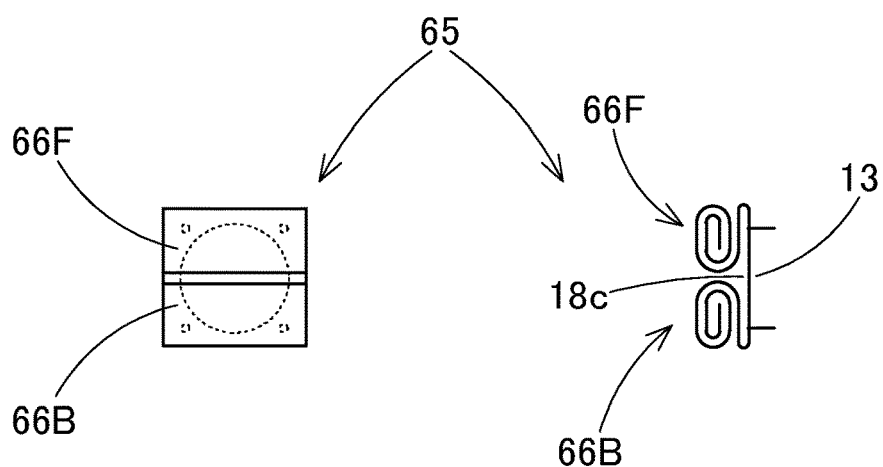

To be installed in the airbag device M, the airbag 10 is folded up into a folded-up body 65, which refers to a folded-up configuration of the airbag 10 as shown in FIG. 11C. The folded-up body 65 is formed by a folding method which will be described later.

Before the airbag 10 is folded up, the retainer 75 is put inside the airbag 10 such that the bolts 75a (FIG. 8A) protrude from the mounting holes 13a. Then the folding method starts.

Referring to FIGS. 8A to 11C, the folding method for providing the folded-up body 65 includes an initial layout step which lays the airbag out flat such that the vehicle-side wall 12 and driver-side wall 18 are laid flat over each other, a first folding process that folds up and contracts the airbag as laid out flat in width in a first direction D1 which runs through the mounting seat 13, and a second folding process that, after the first folding process, folds up and contracts the airbag in width in a second direction D2 which runs through the mounting seat 13 and is orthogonal to the first direction D1. In the folding method of the first embodiment, the first direction D1 is a left-right direction XD and the second direction D2 is a front-rear direction YD.

Figure 8A:
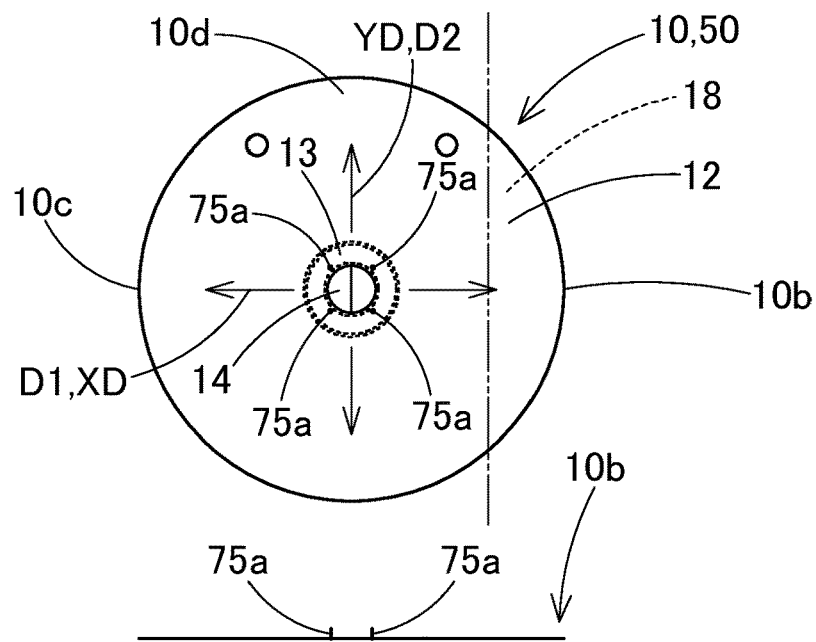
FIGS. 8A, 8B, 8C, 9A, 9B and 9C illustrate a first folding process in a method of folding of the airbag of the first embodiment in order.

Firstly, in the initial layout step, the airbag 10 is laid out flat such that the vehicle-side wall 12 and driver-side wall 18 are laid flat over each other, as shown in FIG. 8A. The airbag 10 in this configuration will be called hereinafter an "initial laid-out body" 50.

The first folding process folds up each of opposite sides in the first direction D1 (i.e. in the left-right direction XD) of the initial laid-out body 50 with respect to the mounting seat 13 with an initial folding step, an initial rolling step and an invaginating step.

Figure 8B:
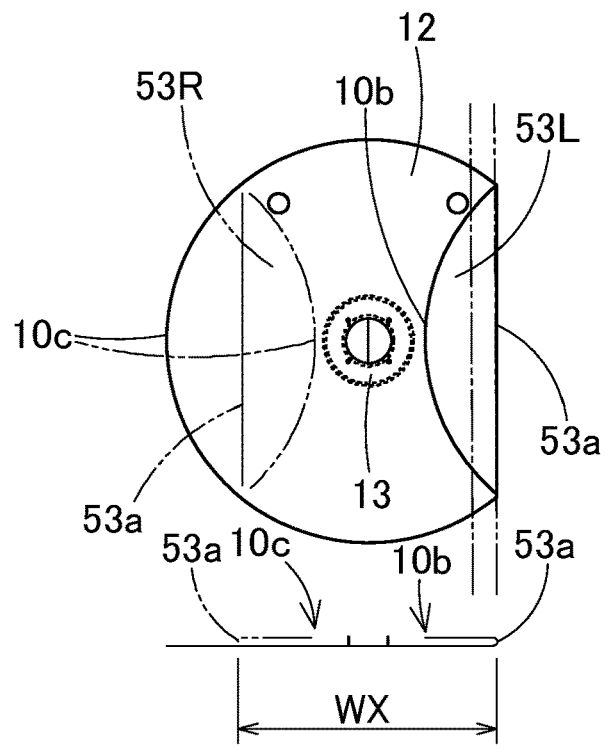

As shown in FIGS. 8A and 8B, in the initial folding step, one of left and right edges 10b and 10c of the initial laid-out body 50 (i.e. one of opposite edges in the first direction D1, i.e. in the left-right direction XD, with respect to the mounting seat 13), by way of example, the left edge 10b of the initial laid-out body 50 is firstly folded back towards the mounting seat 13 on the vehicle-side wall 12 on a crease 53a, which provides a lapped region 53L.

Figure 8C:
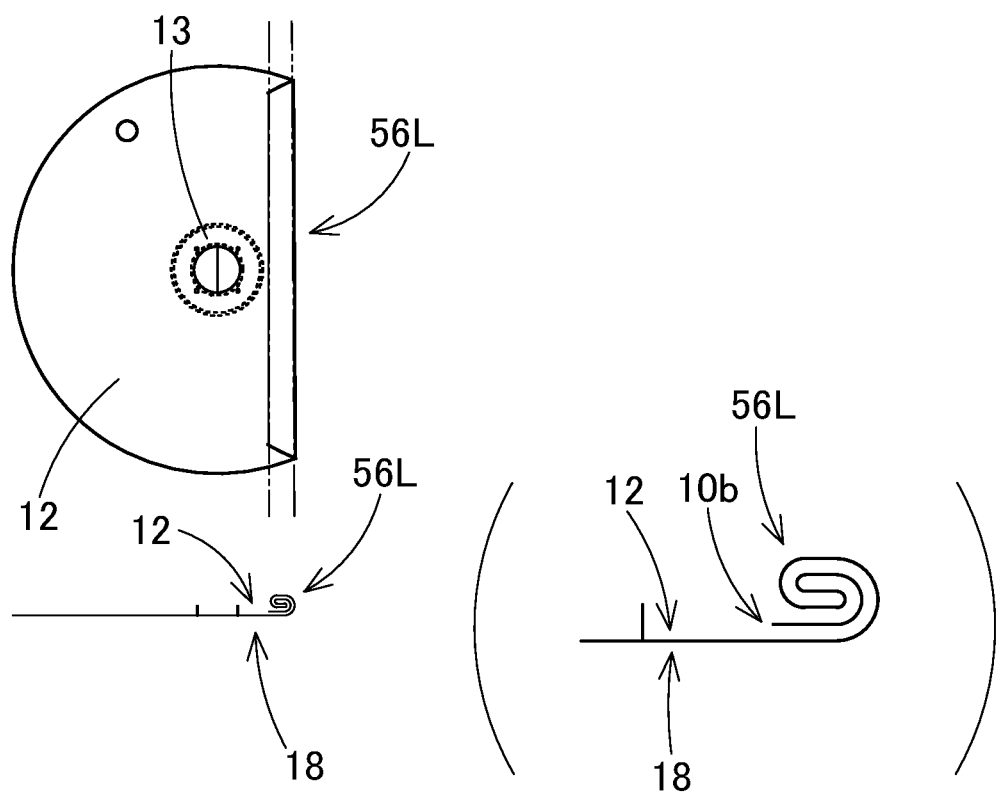

In the initial rolling step, as shown in FIGS. 8B and 8C, the lapped region 53L is rolled towards the mounting seat 13 from the crease 53a on the vehicle-side wall 12, which provides a rolled region 56L in a vicinity of the mounting seat 13.

Figure 9A:
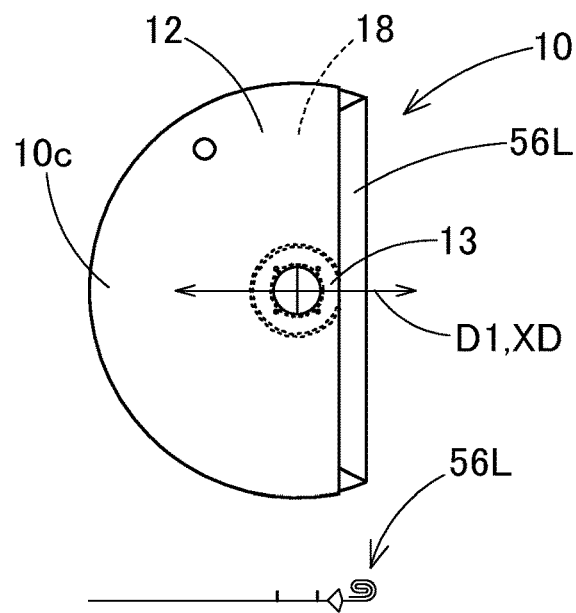
Figure 9B:
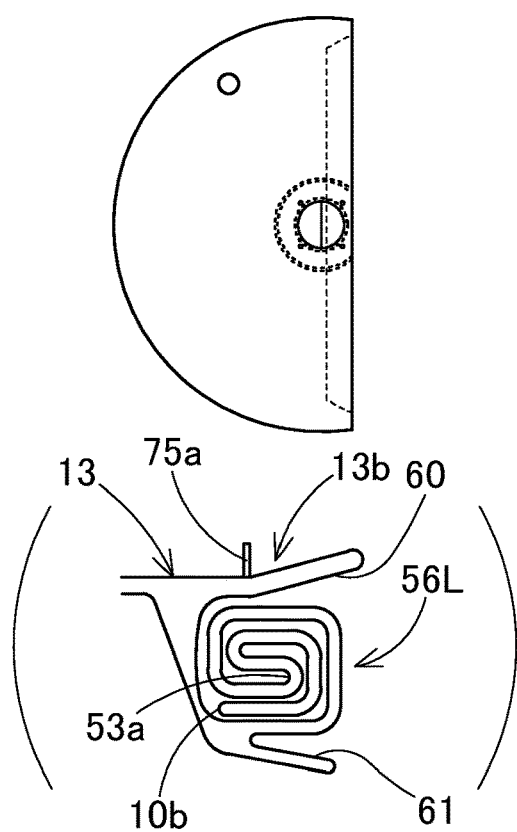

In the invaginating step as shown in FIGS. 9A and 9B, the rolled region 56L formed in the initial rolling step is invaginated in between the vehicle-side wall 12 and driver-side wall 18 in the vicinity of the mounting seat 13. More specifically, a region of the vehicle-side wall 12 proximate to the mounting seat 13 is mountain folded to provide a vehicle-side sheath region 60 while a region of the driver-side wall 18 proximate to the mounting seat 13 is mountain folded to provide a driver-side sheath region 61, and then the rolled region 56L is stored between the vehicle-side sheath region 60 and driver-side sheath region 61 and placed on a left edge 13b region of the mounting seat 13. This provides an invaginated region 59L.

Figure 9C:
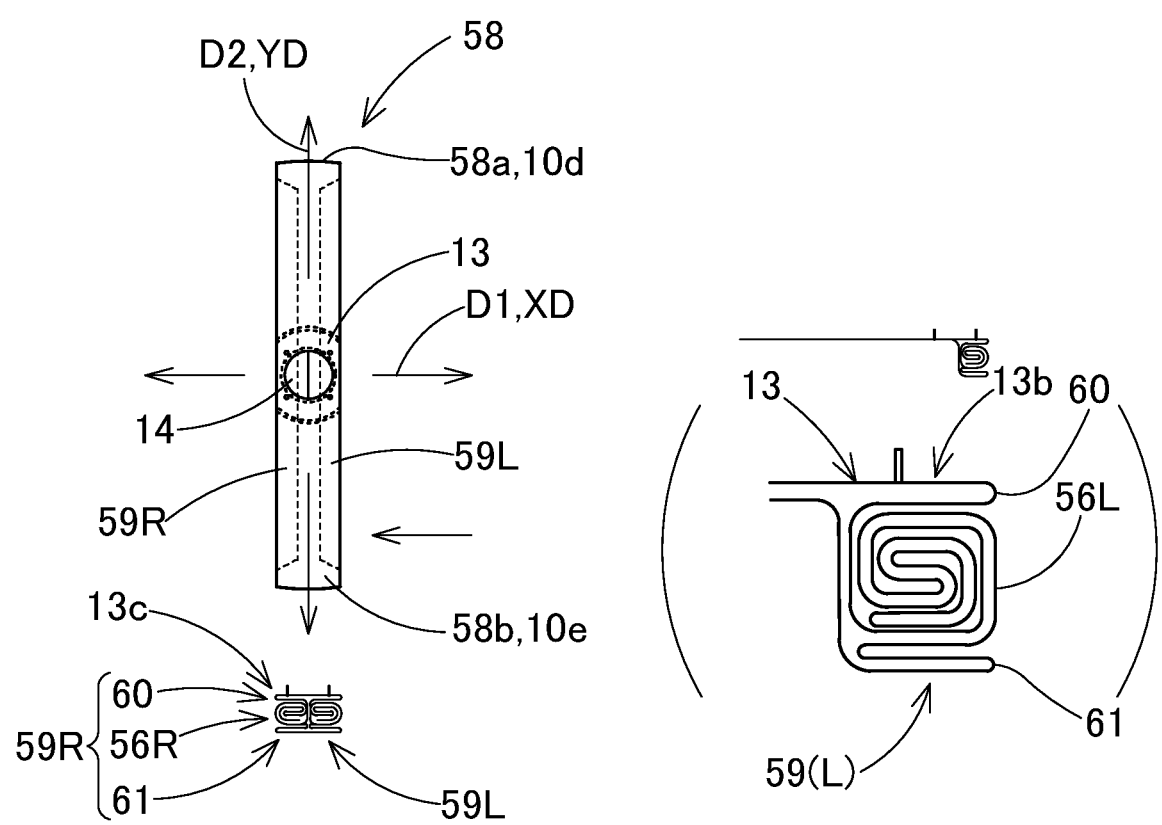

Subsequently, in a similar fashion to the left side, the initial folding, the initial rolling and invaginating is applied to the right edge 10c region (i.e. the opposite edge in the first direction D1, i.e. in the left-right direction XD) of the initial laid-out body 50 in a symmetrical fashion to the left edge 10b region. Thus an invaginated region 59R is provided on the right edge 13b region of the mounting seat 13, as shown in FIG. 9C. The airbag in this configuration will be hereinafter called an "invaginated body" 58.

In this specific embodiment, the initial folding, the initial rolling and invaginating of the first folding process are firstly applied to the left edge 10b region of the airbag 10, and then to the right edge 10c region. Alternatively, however, the right edge 10c region may undergo the first folding process first, and then the left edge 10b region. Further alternatively, the first folding process may be applied to both of the left and right regions of the airbag 10 concurrently.

The second folding process is now described referring to FIGS. 10A to 10C and 11A to 11C. The second folding process folds up each of opposite sides in the second direction D2 (or in the front-rear direction YD) of the invaginated body 58 with respect to the mounting seat 13 towards the mounting seat 13, and places resulting folded regions 66F and 66B on the driver-side wall 18 above the mounting seat 13.

Figure 10A:
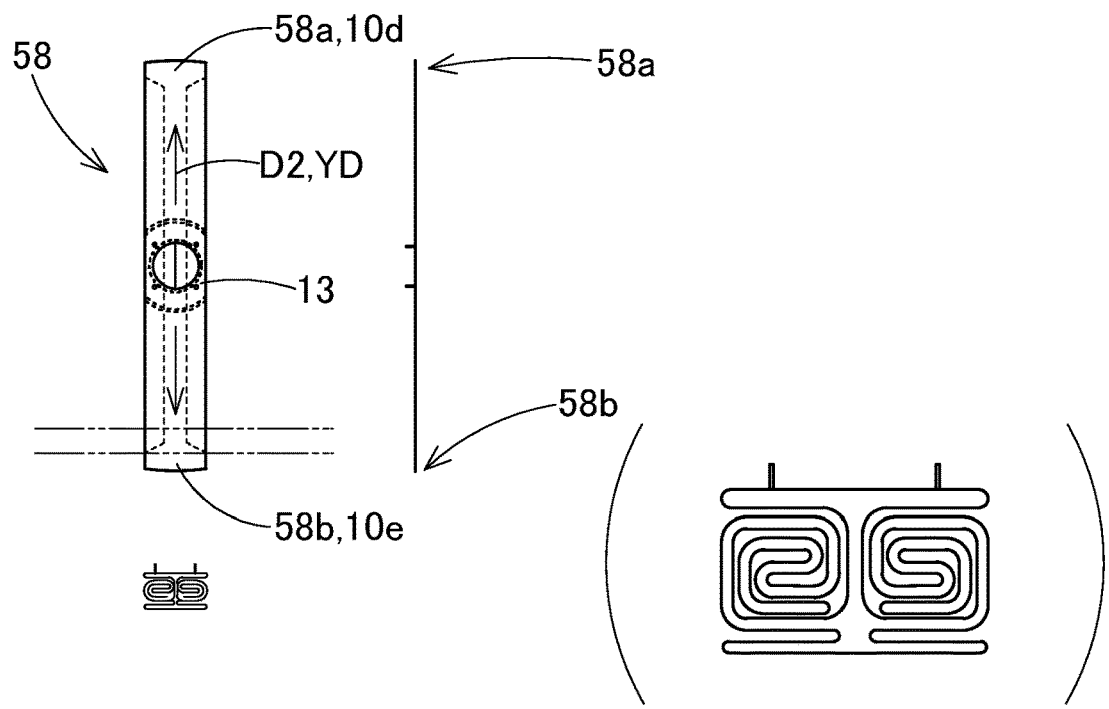
FIGS. 10A, 10B, 10C, 11A, 11B and 11C illustrate a second folding process in the method of folding of the airbag of the first embodiment in order.
Figure 10B:
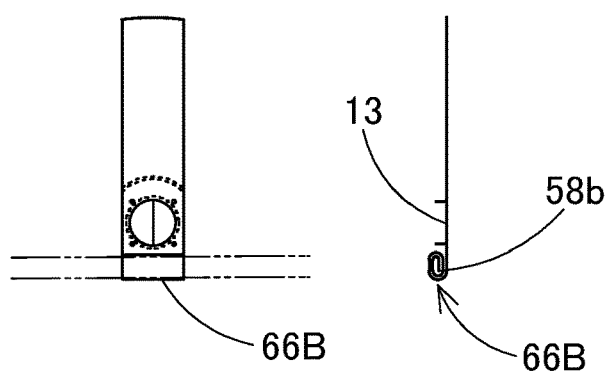
Figure 10C:
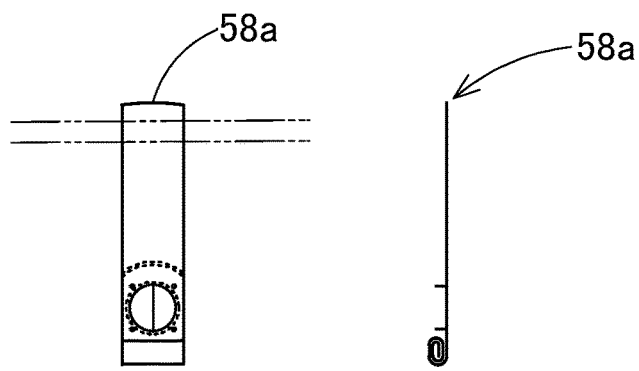

In this specific embodiment, referring to FIGS. 10A to 10C, a rear edge 58b region of the invaginated body 58 (i.e. a rear edge 10e region of the airbag 10), by way of example, is first rolled towards the mounting seat 13 on the vehicle-side wall 12 such that a rolled region 66B is provided. Then a front edge 58a region (i.e. a front edge 10d region of the airbag 10) is rolled towards the mounting seat 13 on the vehicle-side wall 12 such that a rolled region 66F is provided as shown in FIG. 11A. Subsequently, as shown in FIGS. 11B and 11C, the rolled regions 66F and 66B are turned around and placed on the driver-side wall 18 above the mounting seat 13. Thus the second folding process as well as the folding method of the airbag 10 is completed and the folded-up body 65 is provided.

In this specific embodiment, the second folding process is firstly applied to the rear edge 10e region of the airbag 10, and then to the front edge 10d region, symmetrically to the rear edge 10e region. Alternatively, however, the front edge 10d region may undergo the second folding process first, and then the rear edge 10e region. Further alternatively, the second folding process may be applied to both of the front and rear regions of the airbag 10 concurrently.

The folded-up body 65 or airbag 10 is then wrapped up by a predetermined member for keeping the folded-up configuration. Then the airbag 10 is set on the bottom wall 79a of the case 79 such that the bolts 75a of the retainer 75 protrude out of the through holes 79c. Subsequently, the body 77a of the inflator 77 is set in the insert hole 79b of the bottom wall 79a from the lower side such that the bolts 75a of the retainer 75 go through the flange 77c. If the bolts 75a of the retainer 75 are then fastened with unillustrated nuts, the airbag 10 and the inflator 77 are set in and secured to the case or housing 79, with the aid of the retainer 75. Thereafter, the airbag cover 83 is placed over the case 79 and the side wall 79d of the case 79 and the side wall 85 of the airbag cover 83 are joined together with the aid of rivets 81 or the like, thus the airbag cover 83 is mounted on the case 79. If then an unillustrated horn switch mechanism is attached to the mounting tongues 79e of the case 79, the airbag device M is completed. Then the unillustrated mounting bases of the horn switch mechanism are used to mount the airbag device M on the steering wheel body 1 which has been mounted on the steering shaft SS. Thus the airbag device M is mounted on a vehicle.

When the airbag device M of the first embodiment is actuated and an inflation gas G is fed to the airbag 10 via the inlet opening 14, the airbag 10 is inflated and pushes and opens the doors 84a of the airbag cover 83. Then the airbag 10 emerges out of the case 79 and is deployed over the top plane PR of the rim R, as indicated with double-dotted lines in FIG. 2.

When the airbag 10 as mounted on the steering wheel W is inflated, it unfolds generally in a reverse fashion to the folding method. That is, the folds formed in the second folding process unfold first and then the folds formed in the first folding process unfold. Specifically, in an initial stage of deployment, as shown in FIGS. 12A, 12B, 13A and 13B, the folded-up body 65 firstly unfolds along the second direction D2 (i.e. front-rear direction YD) in which the second folding process was conducted, and then moves on to unfolding of the folds formed in the last step of the first folding process. Here in the first embodiment, the last step of the first folding process is composed of the invagination of the rolled regions 56L and 56R formed in the initial rolling step in between the vehicle-side wall 12 and driver-side wall 18. Since the vehicle-side wall 12 and driver-side wall 18 draw away from each other due to inflation of the airbag 10, the invagination easily undoes in parallel with the unfolding of the folds of the second folding process, as shown in FIGS. 14A to 14D. Further, the rolled regions 56L and 56R formed in the initial rolling step, which was conducted right before the invaginating step, also easily start to unroll along with undoing of the invagination. Accordingly, in the initial stage of deployment, the airbag 10 is not only inflated into an elongated contour in the second direction D2 (in the front-rear direction YD) above the mounting seat 13, but also ensures a wide enough width in the first direction D1 (in the left-right direction XD) though it is smaller than a width WX (FIG. 8B) between the creases 53a of the initial folding. Since the airbag 10 in the initial stage of deployment has an elongated contour in the second direction D2 (in the front-rear direction YD) with certain thickness and with no partly projecting portion in a vicinity of the center 18c of the driver-side wall 18 (FIGS. 12B and 12C), the airbag 10 is capable of catching a head DH of a driver D smoothly without giving an undue pressure to the head DH or moving towards a region under the chin (neck) DJ of the driver D even if the head DH is positioned close to the steering wheel W. Of course, the airbag 10 as has gone through the initial stage of deployment is fully unfolded and inflated both in the opposite end regions in the second direction D2 (in the front-rear direction D) and in the opposite end regions in the first direction D1 (in the left-right direction XD), thus is capable of catching a driver D "in position" adequately with the driver-side wall 18.

Therefore, the folding method of the first embodiment enables the driver's seat airbag 10 to unfold and inflate in an adequate fashion in the initial stage of deployment, and enables the airbag 10 to catch the driver's head DH adequately without giving an undue pressure to the head DH or moving towards the neck region DJ of the driver D even if the head DH is disposed close to the steering wheel W.

In the folding method of the first embodiment, the first direction D1 in the first folding process is the direction corresponding to the left-right direction XD of the steering wheel W as mounted on the vehicle.

Figure 12A:
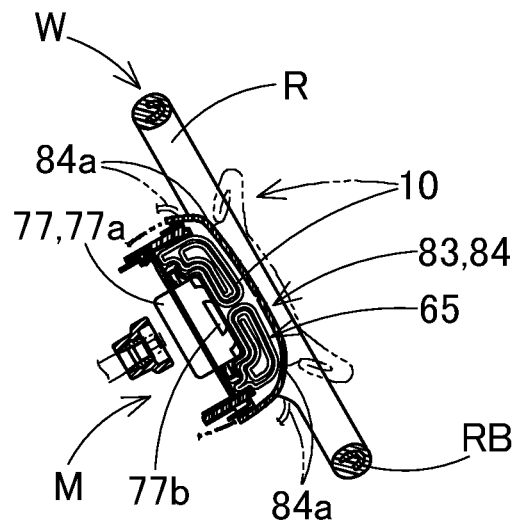
FIGS. 12A, 12B, 12C and 12D illustrate a deployment behavior of the airbag of the first embodiment in order by schematic vertical sectional views.
Figure 12B:
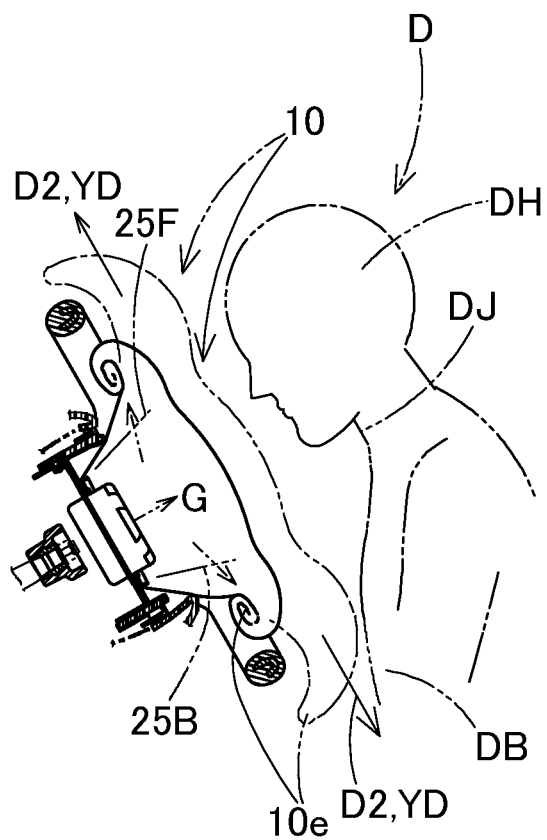
Figure 12C:
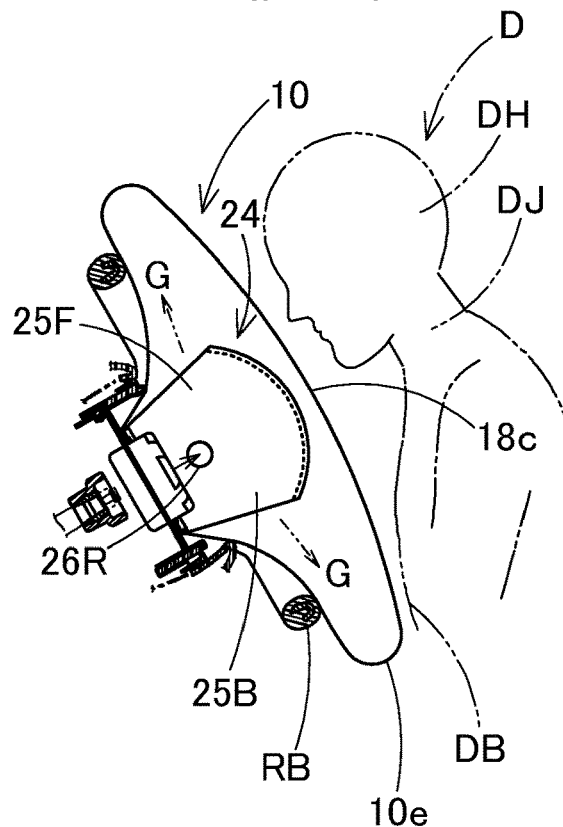
Figure 12D:
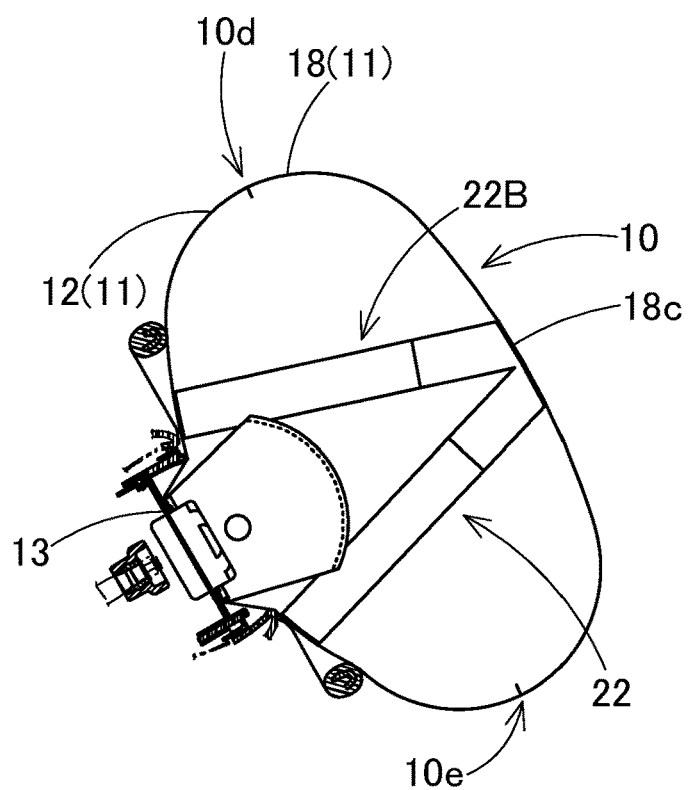
Figure 13A:
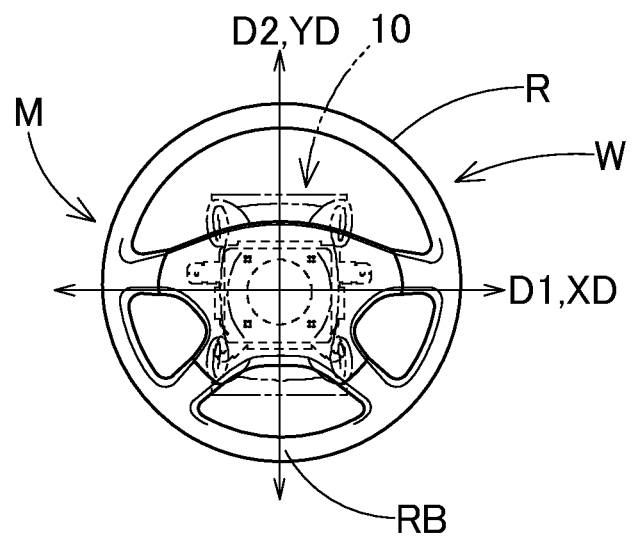
FIGS. 13A, 13B, 13C and 13D illustrate the deployment behavior of the airbag of the first embodiment in order by schematic plan views.
Figure 13B:
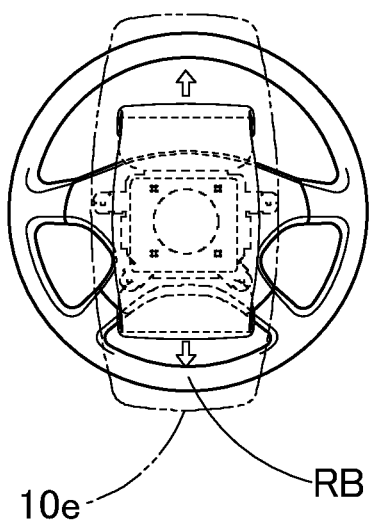
Figure 13C:
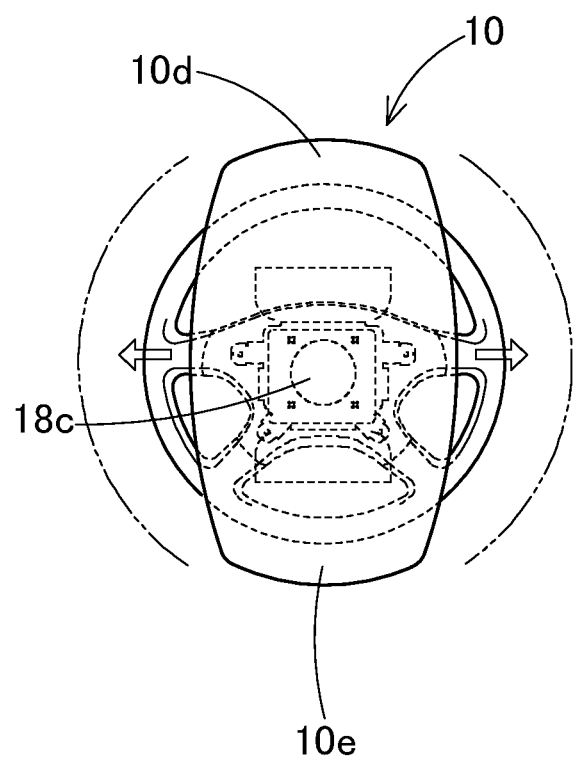
Figure 13D:
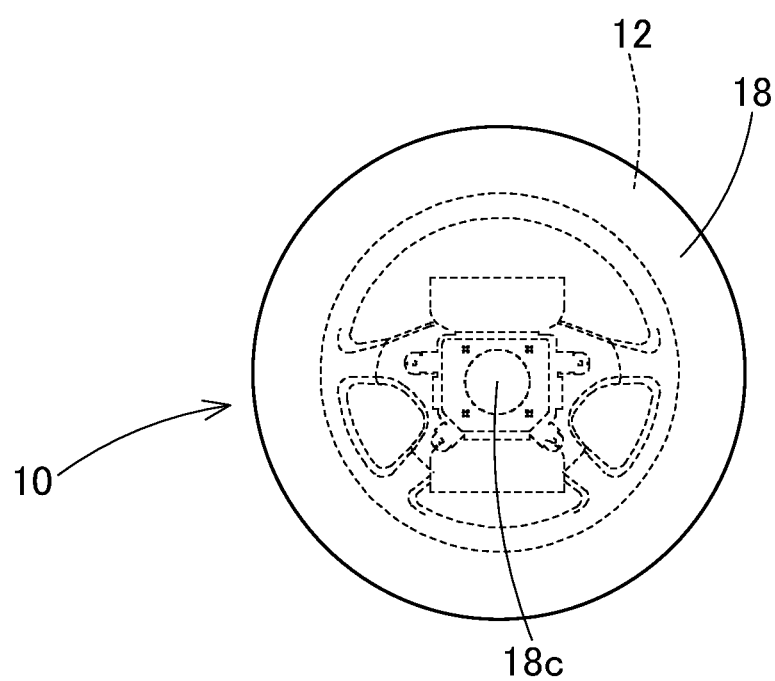
Figure 14A:
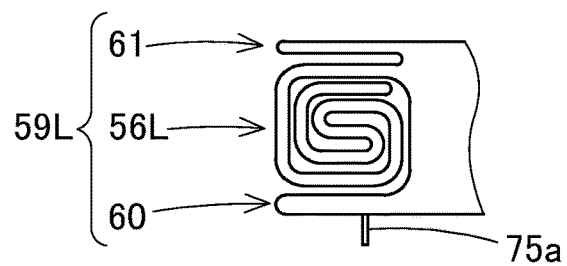
FIGS. 14A, 14B, 14C and 14D illustrate the way a folded portion formed in an invaginating step unfolds.
Figure 14B:
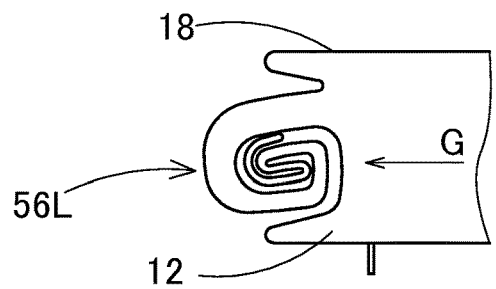
Figure 14C:
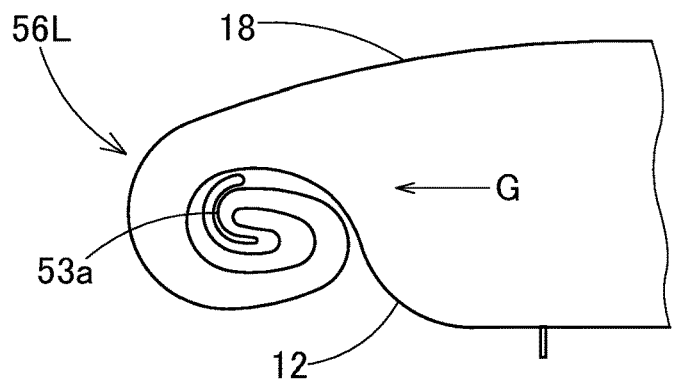
Figure 14D:
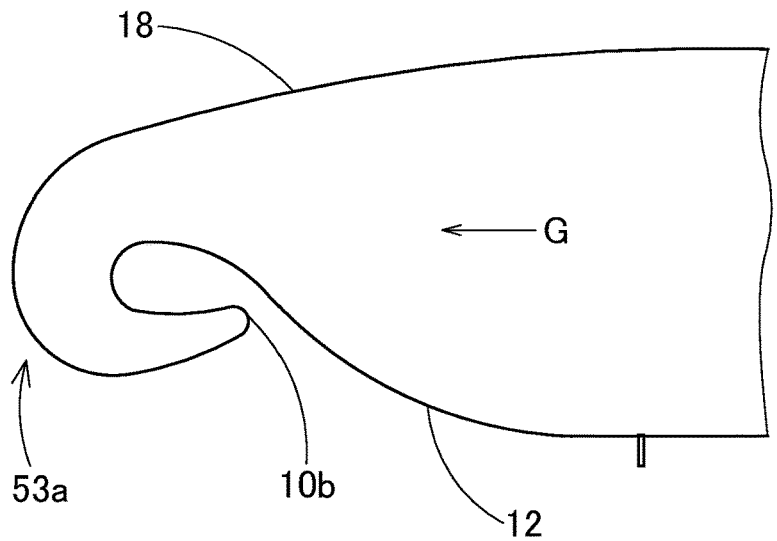

If the first direction D1 is the direction corresponding to the left-right direction XD of the steering wheel W, the second direction D2 is the front-rear direction YD, and the airbag 10 unfolds first in the front-rear direction YD, and extends the rear end 10e region into a space between a rear region RB of the rim R of the steering wheel W and an abdomen DB of the driver D in an initial stage of airbag deployment, as shown in FIGS. 12B and 12C. As a consequence, even if the driver D is positioned close to the steering wheel W, the rear end 10e region of the airbag 10 deployed in the space between the rear region RB of the rim R and the abdomen DB of the driver D is inflated and gains an enough thickness, supported by the rim, thus is capable of cushioning and protecting the abdomen DB in an adequate fashion.

Moreover, the airbag 10 of the first embodiment includes the redirecting member 24 that is disposed in the periphery of the mounting seat 13 inside the airbag 10 and includes the main outlet ports 25F and 25B for delivering an inflowing inflation gas G towards both directions in the second direction D2, i.e. towards the front and rear.

The redirecting member 24 configured as described above delivers the inflation gas G towards the front and rear in the second direction D2 (i.e. in the front-rear direction YD) in the initial stage of airbag deployment, thus further helps unfold and elongate the airbag 10 in the second direction D2 in a steady fashion, thereby provides stabilization of the above-described advantageous effects of the invention.

Especially, the redirecting member 24 in the first embodiment is further provided with the auxiliary outlet ports 26L and 26R which release in combination less amount of the inflation gas G than the main outlet ports 25F and 25B towards the first direction D1.

The auxiliary outlet ports 26L and 26R release the inflation gas G in the first direction D1, i.e. in the left-right direction XD, and help unfold and inflate the airbag 10 as gone through the initial stage of deployment towards the left and right (i.e. in the left-right direction XD) quickly.

In the first embodiment, furthermore, the airbag 10 internally includes the four tethers 22 (i.e. 22A, 22B, 22C and 22D) each of which regulates a clearance between a vicinity of the mounting seat 13 and the driver-side wall 18 at airbag deployment. The root region 22b of each of the tethers 22, i.e. the region joined to the vicinity of the mounting seat 13, is disposed at a position between the first direction D1 and second direction D2. Specifically, the root region 22b of the left front tether 22A is located at a diagonally forward left position of the inlet opening 14, in front of the redirecting member 24 and at a vicinity of the left edge 13b of the mounting seat 13. The root region 22b of the right front tether 22B is located at a diagonally forward right position of the inlet opening 14, in front of the redirecting member 24 and at a vicinity of the right edge 13c of the mounting seat 13. The root region 22b of the left rear tether 22C is located at a diagonally backward left position of the inlet opening 14, at the rear of the redirecting member 24 and at a vicinity of the left edge 13b of the mounting seat 13. The root region 22b of the right rear tether 22D is located at a diagonally backward right position of the inlet opening 14, at the rear of the redirecting member 24 and at a vicinity of the right edge 13c of the mounting seat 13.

The tethers 22 (i.e. 22A, 22B, 22C and 22D) limit the clearance between the vehicle-side wall 12 and the driver-side wall 18, thus prevent the driver-side wall 18 from protruding towards the driver D partly. Since the root region 22b of each of the tethers 22 is disposed at a position between the first direction D1 and second direction D2, the tethers 22 are not likely to hamper the inflation gases G released out of the main outlet ports 25F and 25B of the redirecting member 24 in the second direction D2 or hamper the inflation gases G released out of the auxiliary outlet ports 26L and 26R in the first direction D1, and ensure a steady redirecting effect of the redirecting member 24.

In the first embodiment, the airbag 10 is folded up such that the airbag 10 unfold first in the front-rear direction YD (in the second direction D2) while ensuring a width in the front-rear direction YD as well as in the let-right direction XD in the central area 18*c* of the driver-side wall 18 and a thickness in the central area 18*c* in the initial stage of airbag deployment. This configuration enables the airbag 10 to catch the head DH of an out-of-position driver D adequately while preventing a portion of the airbag 10 from moving towards the region DJ under the chin.

In order to catch the head DH of an out-of-position driver D adequately while preventing a portion of the airbag from moving towards the region DJ under the chin, the airbag may be folded up by an alternative folding method according to the second embodiment illustrated and shown in FIGS. 16A to 19C.

Figure 15A:
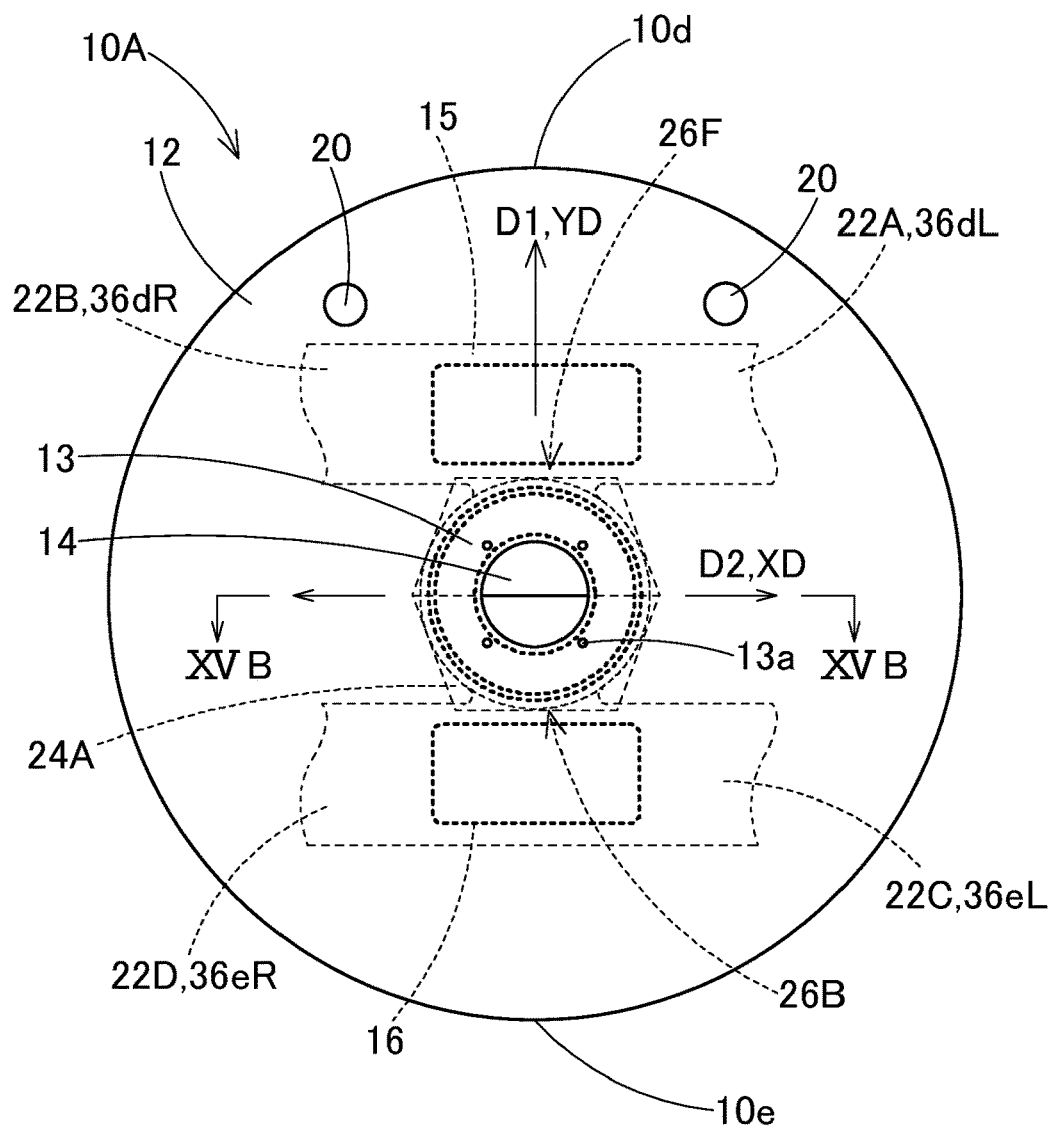
FIG. 15A is a bottom view of an airbag of the second embodiment.
Figure 15B:
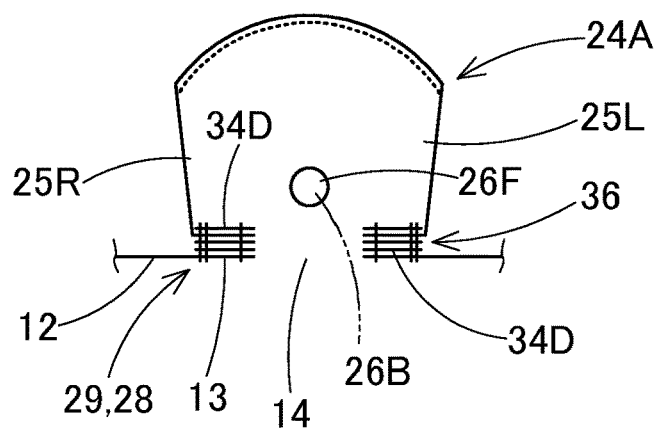
FIG. 15B is a sectional end view taken along line XVB-XVB of FIG. 15A.

As shown in FIGS. 15A and 15B, an airbag 10A in the second embodiment has a similar configuration to the airbag 10 in the first embodiment except a few points. A redirecting member 24A of the airbag 10A is configured to release inflation gas towards the left-right direction XD from a pair of main inlet ports 25L and 25R. In other words, the redirecting member 24A is configured in such a manner that the redirecting member 24 in the first embodiment is rotated 90 degrees about the inlet opening 14. Further, the first direction D1 in the second embodiment is the front-rear direction YD as shown in FIGS. 16A to 16C and 17A to 17C and the second direction D2 is the left-rear direction XD as shown in FIGS. 18A to 18C and 19A to 19C, such that the airbag 10A of the second embodiment is firstly folded up in the front-rear direction YD in the first folding process and folded up in the left-right direction XD in the second folding process.

Specifically, the airbag 10A in the second embodiment is folded up so as to unfold and be inflated first in the left-right direction XD in an initial stage of airbag deployment, in such a manner that the deployment behavior of the airbag 10 of the first embodiment is rotated 90 degrees about the inlet opening 14.

Figure 16A:
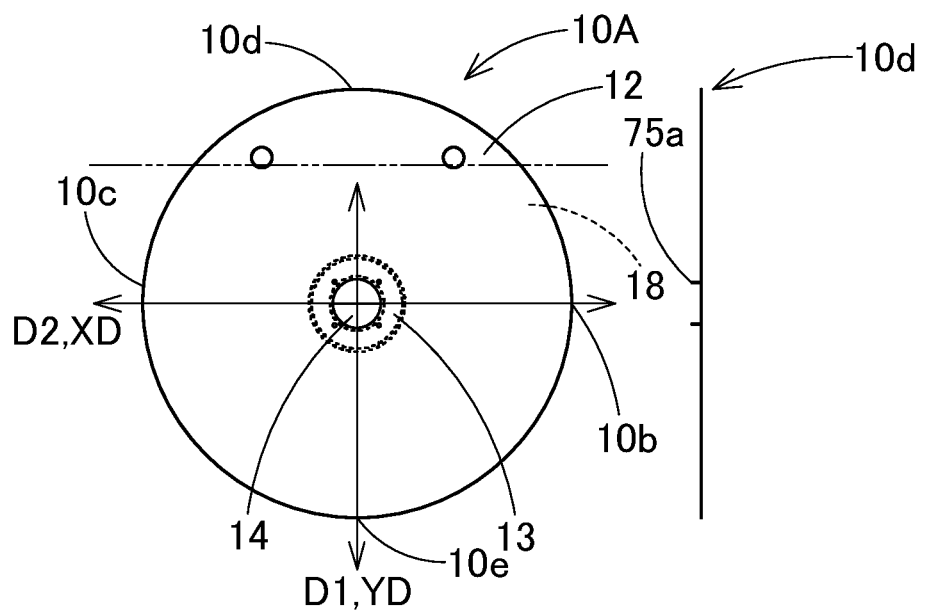
FIGS. 16A, 16B, 16C, 17A, 17B and 17C illustrate a first folding process in a method of folding of the airbag of the second embodiment in order.
Figure 16B:
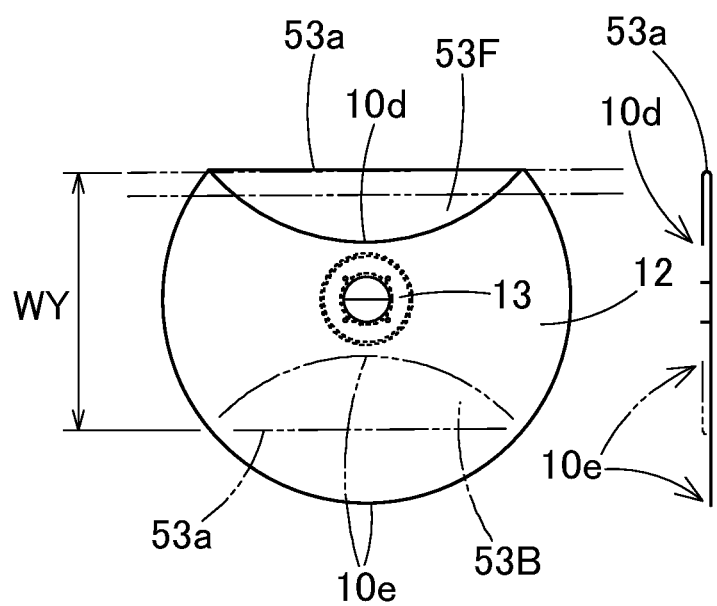
Figure 16C:
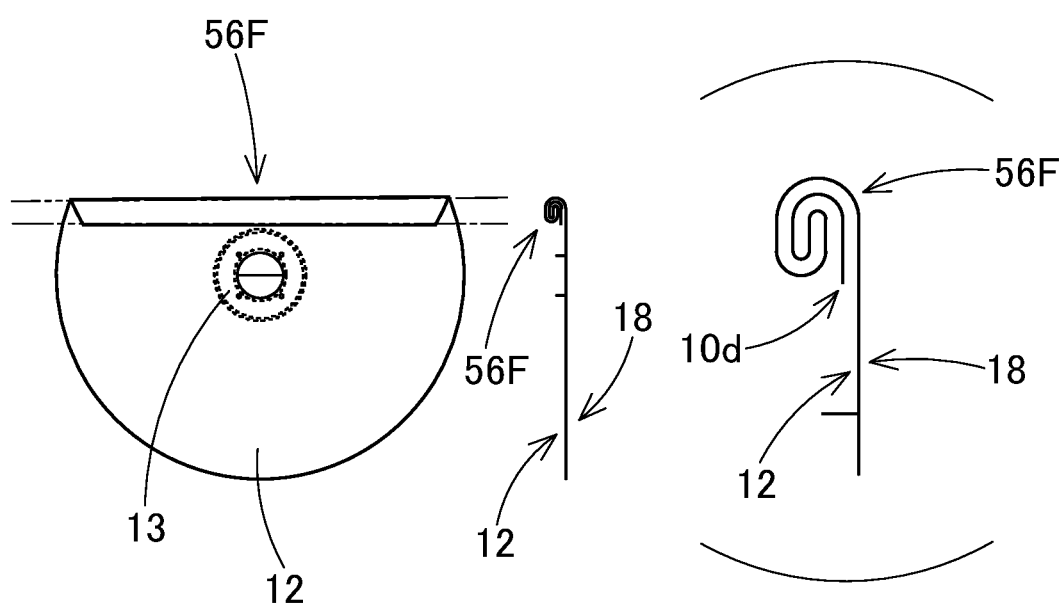
Figure 17A:
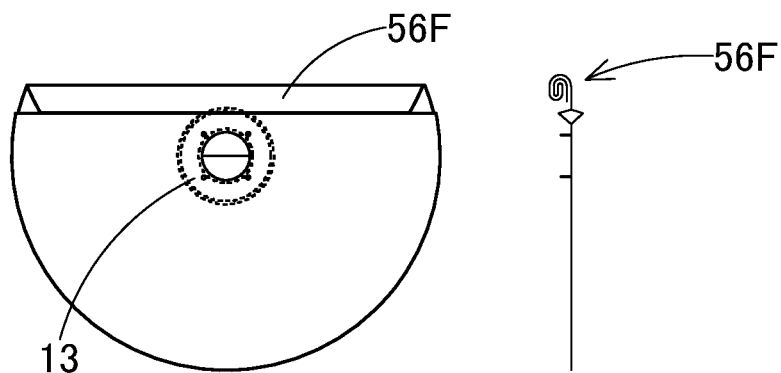
Figure 17B:
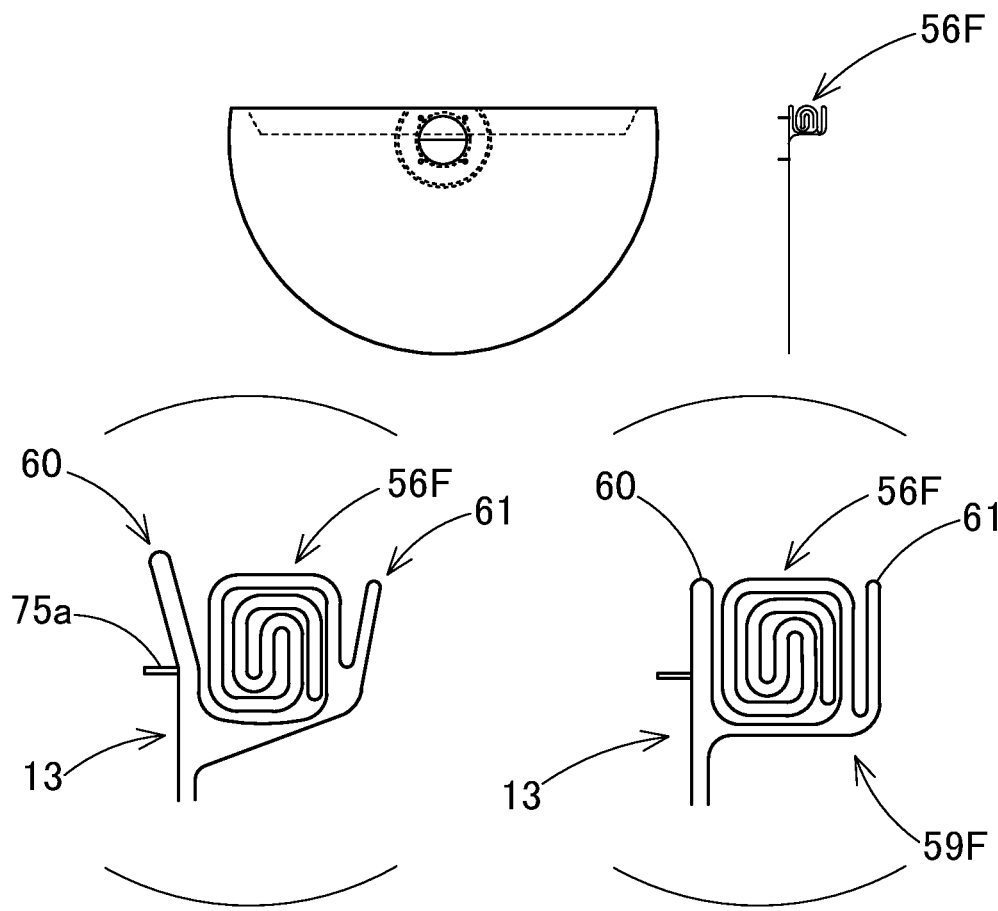
Figure 17C:
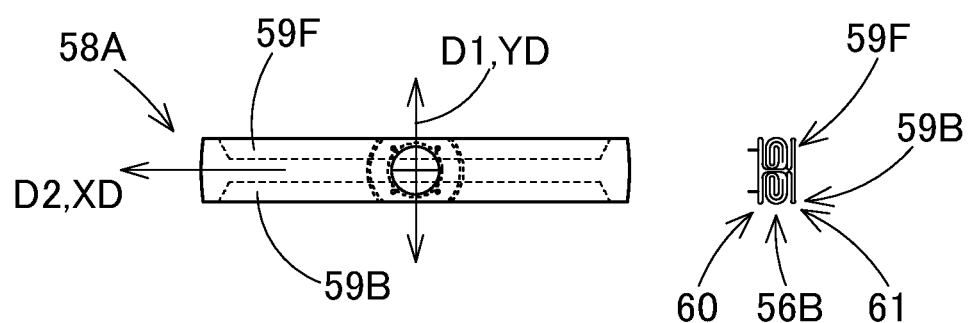

In the second embodiment, the airbag 10A is laid out flat such that the vehicle-side wall 12 and driver-side wall 18 are laid flat over each other, as shown in FIG. 16A, in a similar fashion to the first embodiment. From this state, as shown in FIGS. 16A and 16B, the airbag 10A is subjected to the initial folding step, in which one of front and rear edges 10*d* and 10*e* of the airbag 10A (i.e. one of opposite edges in the first direction D1, i.e. in the front-rear direction YD, with respect to the mounting seat 13), by way of example, the front edge 10*d* is firstly folded back towards the mounting seat 13 on the vehicle-side wall 12 on a crease 53*a*, which provides a lapped region 53F. Then in the initial rolling step, as shown in FIGS. 16B and 16C, the lapped region 53F is rolled towards the mounting seat 13 from the crease 53*a* on the vehicle-side wall 12, which provides a rolled region 56F in a vicinity of the mounting seat 13. Then in the invaginating step shown in FIGS. 17A and 17B, the rolled region 56F formed in the initial rolling step is invaginated in between the vehicle-side wall 12 and driver-side wall 18 in the vicinity of the mounting seat 13. This provides an invaginated region 59F, as shown in FIG. 17B. In a similar fashion, the rear edge 10*e* region of the airbag 10A is subjected to the initial folding, the initial rolling and invagination. Thus an "invaginated body" 58A is formed as shown in FIG. 17C, in which the invaginated regions 59F and 59B are placed on the mounting seat 13.

Figure 18A:
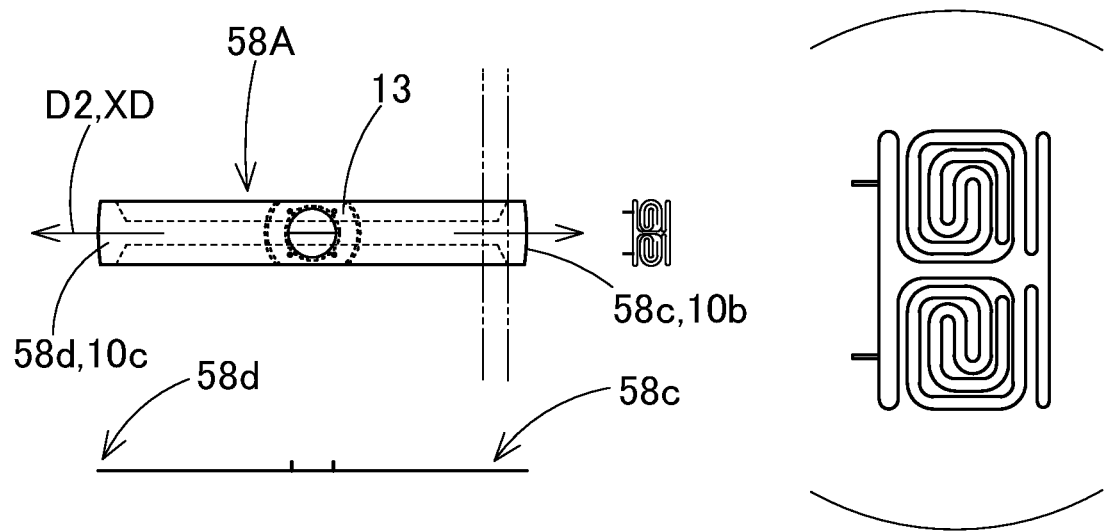
FIGS. 18A, 18B, 18C, 19A, 19B and 19C illustrate a second folding process in the method of folding of the airbag of the second embodiment in order.
Figure 18B:
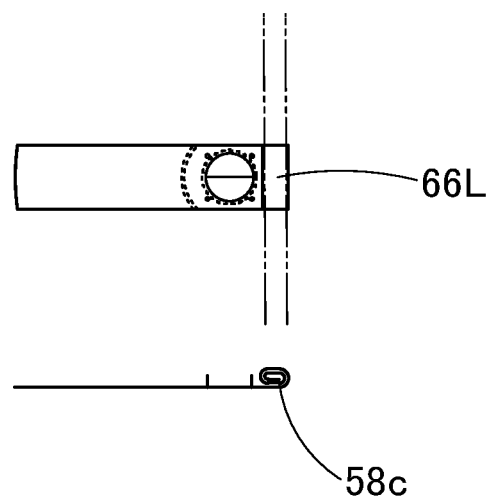
Figure 18C:
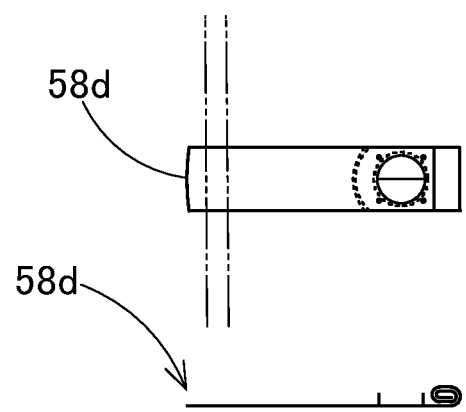
Figure 19A:
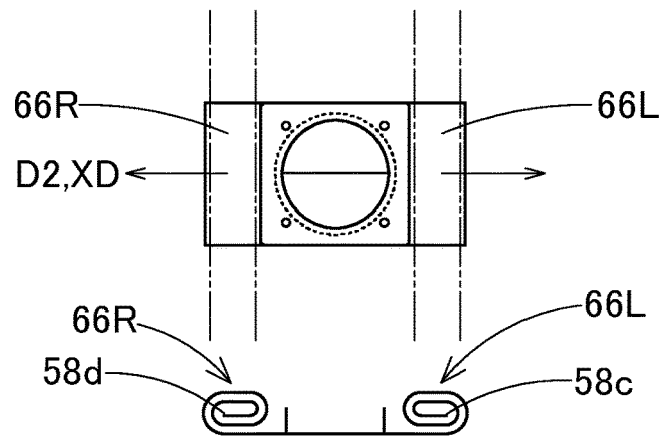
Figure 19B:
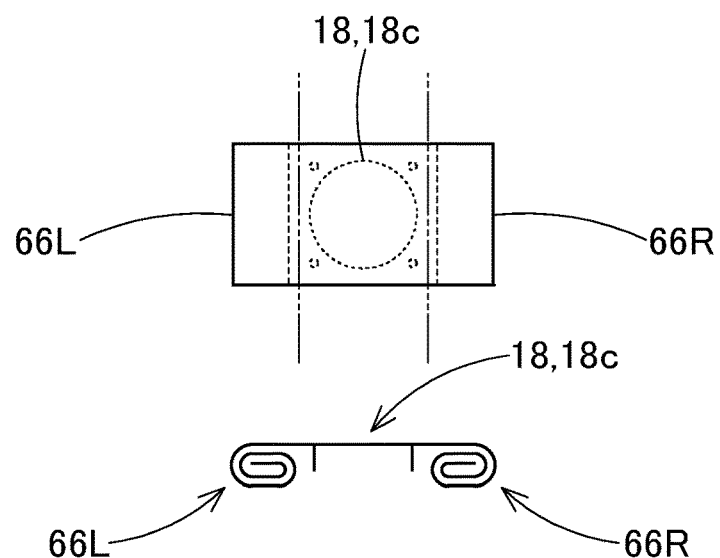
Figure 19C:
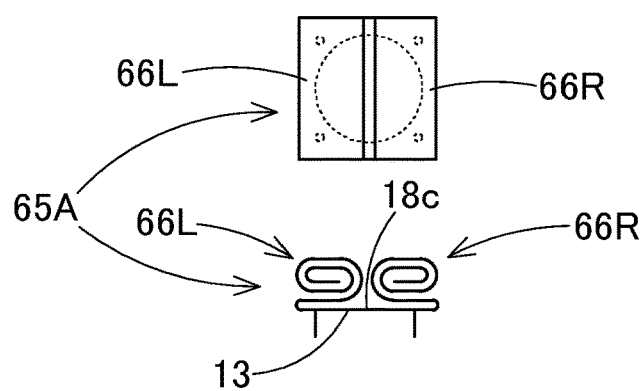

In the second folding process, as shown in FIGS. 18A and 18B, a left edge 58*c* region of the invaginated body 58A (i.e. a left edge 10*b* region of the airbag 10A), by way of example, is first rolled towards the mounting seat 13 on the vehicle-side wall 12 such that a rolled region 66L is provided, as shown in FIGS. 18A to 18C. Then a right edge 58*d* region (i.e. a right edge 10*c* region of the airbag 10A) is rolled towards the mounting seat 13 on the vehicle-side wall 12 such that a rolled region 66R is provided as shown in FIG. 19A. Subsequently, as shown in FIGS. 19B and 19C, the rolled regions 66L and 66R are turned around and placed on the driver-side wall 18 above the mounting seat 13. Thus the second folding process as well as the folding method of the airbag 10A is completed and a folded-up body 65A is provided.

The airbag 10A thus folded up is assembled into an airbag device M and mounted on the steering wheel W in a similar fashion to the first embodiment.

The airbag 10A folded up by the folding method of the second embodiment unfolds in such a manner that the deployment behavior of the airbag 10 of the first embodiment is rotated 90 degrees about the inlet opening 14, but is still capable of catching a head of an out-of-position driver adequately without moving towards a region under the chin of the driver.

Figure 20A:
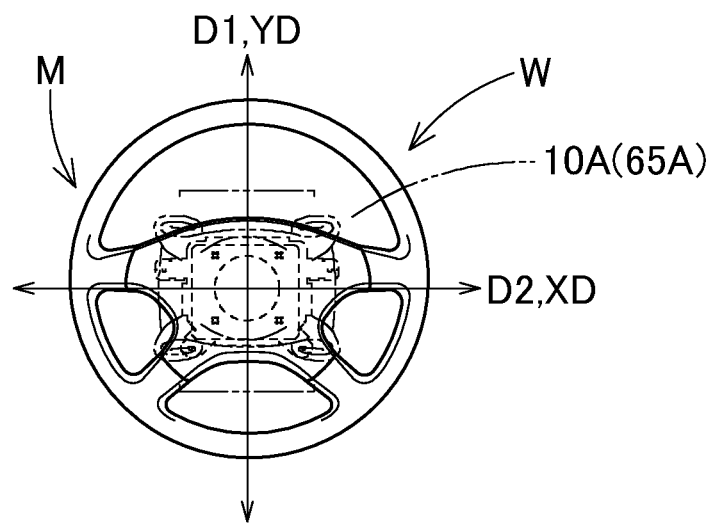
FIGS. 20A, 20B, 20C and 20D illustrate a deployment behavior of the airbag of the second embodiment in order by schematic plan views.
Figure 20B:
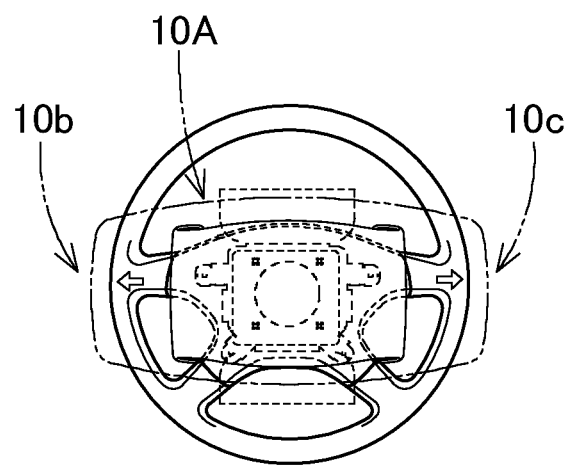
Figure 20C:
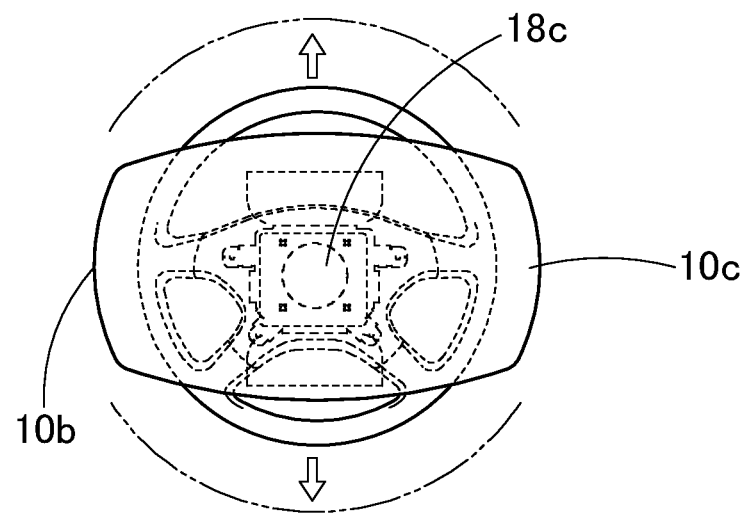
Figure 20D:
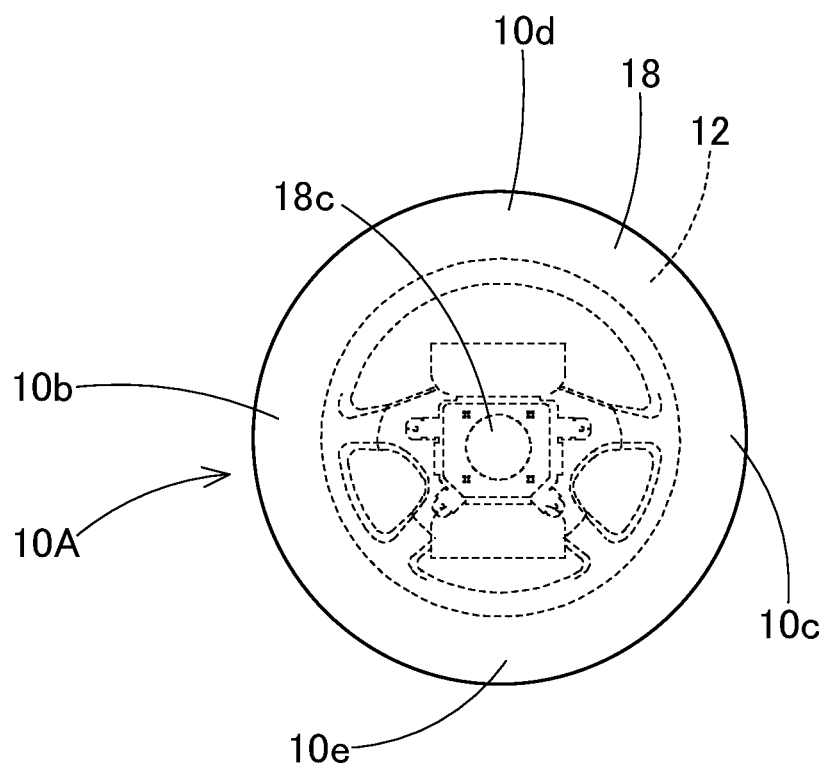

Specifically, in an initial stage of deployment, the folded-up body 65A firstly unfolds along the second direction D2 (i.e. left-rear direction XD) in which the second folding process was conducted, and then moves on to unfolding of the folds formed in the last step, i.e. the invaginating step of the first folding process. Here, since the invaginating step is merely composed of the invagination of the rolled regions 56F and 56B formed in the initial rolling step each in between the vehicle-side wall 12 and driver-side wall 18 (FIGS. 17B and 17C), and the vehicle-side wall 12 and driver-side wall 18 draw away from each other due to inflation of the airbag 10A, the invagination easily undoes in parallel with the unfolding of the folds of the second folding process. Further, the rolled regions 56F and 56B formed in the initial rolling step, which was conducted right before the invaginating step, also easily start to unroll along with unfolding of the invagination. Accordingly, as shown in FIGS. 20A to 20C, in the initial stage of deployment, the airbag 10A is not only inflated into an elongated contour in the second direction D2 (in the left-right direction XD) above the mounting seat 13, but also ensures a wide enough width in the first direction D1 (in the front-rear direction YD) though it is smaller than a width WY (FIG. 16B) between the creases 53*a* of the initial folding. Since the airbag 10A in the initial stage of deployment has an elongated contour in the second direction D2 (in the left-right direction XD) with certain thickness and with no partly projecting portion in a vicinity of the center 18*c* of the driver-side wall 18, the airbag 10 is capable of catching a head DH of a driver D smoothly without giving an undue pressure to the head DH or moving towards the region under the chin (neck) DJ of the driver D even if the driver D sits close to the steering wheel W. Of course, the airbag 10A as has gone through the initial stage of deployment is fully unfolded and inflated in the opposite end regions 10*d* and 10*e* in the first direction D1 (in the front-rear direction YD) as well as in the opposite end regions 10*b* and 10*c* in the second direction D2 (in the left-right direction XD), thus is capable of catching a driver D "in position" adequately with the driver-side wall 18.

Therefore, with the folding method of the second embodiment, the airbag 10A is capable of unfolding and inflating in an adequate fashion in the initial stage of deployment, and is capable of catching the driver's head DH adequately without giving an undue pressure to the head DH or moving towards the neck region DJ of the driver D even if the head DH is disposed close to the steering wheel W.

Although the second folding process of each the foregoing embodiments is composed of rolling the opposite end regions 58*a* and 58*b*/58*c* and 58*d* of the invaginated body 58/58A on the vehicle-side wall 12 and placing resulting rolled regions on the driver-side wall 18 above the mounting seat 13, the second folding process should not be limited thereby. By way of example, the second folding process may alternatively be composed of rolling or bellows-folding on the driver-side wall 18. Further alternatively, it may be composed of two different ways of folding such as the initial folding and initial rolling in the first folding process. Moreover, one side of the invaginated body 58/58A with respect to the mounting seat 13 may be folded up in a different fashion from the other side.

In the initial folding step and initial rolling step of the foregoing embodiments, the opposite end regions in the first direction of the airbag are each folded and rolled on the vehicle-side wall 12. However, the initial folding step and initial rolling step may be conducted on the driver-side wall 18. It is further conceivable to conduct the initial folding on the driver-side wall 18 and conduct the initial rolling on the vehicle-side wall 12, or to conduct the initial folding on the vehicle-side wall 12 and conduct the initial rolling on the driver-side wall 18. Nevertheless, it is more preferable to conduct both the initial folding and initial folding of the first folding process on the vehicle-side wall 12 as in the first and second embodiments, because that is more effective than other folding methods in the light of prevention of protrusion of a part of unfolding portion of the airbag towards the driver.

What is claimed is:

1. A method of folding an airbag for a driver's seat adapted to be mounted on and stored in a boss section of a steering wheel of a vehicle, the airbag comprising a vehicle-side wall that is adapted to be supported by a rim of the steering wheel when the airbag is inflated with an inflation gas, a driver-side wall that is joined with the vehicle-side wall by an outer circumferential edge thereof and deployable towards a driver's seat, an inlet opening that is disposed in a vicinity of a center of the vehicle-side wall for introducing an inflation gas, and a mounting seat that is composed of a peripheral area of the inlet opening, the airbag being adapted to be secured to the boss section by the mounting seat, the method of folding comprising:
an initial layout step that lays the airbag out flat such that the vehicle-side wall and the driver-side wall are laid flat over each other;
a first folding process that folds up and contracts the airbag as laid out flat in width in a first direction which runs through the mounting seat, the first folding process comprising:
an initial folding step that folds back each of opposite sides in the first direction of the airbag as laid out flat with respect to the mounting seat towards the mounting seat;
an initial rolling step that rolls the airbag towards the mounting seat from creases formed in the initial folding step and forms a pair of rolled regions beside the mounting seat; and
an invaginating step that invaginates each of the rolled regions in between the vehicle-side wall and driver-side wall in proximity to the mounting seat, and
a second folding process that, after the first folding process, folds up and contracts the airbag as undergone the first folding process in width in a second direction which runs through the mounting seat and is orthogonal to the first direction, the second folding process comprising folding up of opposite sides in the second direction of the airbag with respect to the mounting seat each towards the mounting seat.

2. The method of folding according to claim 1, wherein the first direction in the first folding process is a direction corresponding to a left and right direction of the steering wheel as mounted on the vehicle.

3. The method of folding according to claim 1, wherein the airbag further comprises a redirecting member that is disposed in a periphery of the mounting seat inside the airbag and includes a pair of main outlet ports that deliver an inflowing inflation gas towards both directions in the second direction.

4. The method of folding according to claim 3, wherein the redirecting member further comprises a pair of auxiliary outlet ports which release in combination less amount of inflation gas than the main outlet ports towards both directions in the first direction.

5. The method of folding according to claim 3, wherein:
the airbag further internally includes four tethers each of which regulates a clearance between a vicinity of the mounting seat and the driver-side wall at airbag deployment; and
a root region of each of the tethers joined to the vicinity of the mounting seat is disposed at a position between the first direction and second direction.

* * * * *